(12) United States Patent
Tsai et al.

(10) Patent No.: US 12,064,754 B2
(45) Date of Patent: Aug. 20, 2024

(54) TITANIUM CATALYST AND SYNTHESIZING POLYESTER RESINS

(71) Applicants: NATIONAL TSING HUA UNIVERSITY, Hsinchu (TW); Chang Chun Plastics Co., Ltd., Taipei (TW); Chang Chun Petrochemical Co., LTD., Taipei (TW); DAIREN CHEMICAL CORP., Taipei (TW)

(72) Inventors: Yi-Chou Tsai, Hsinchu (TW); John Di Yi Ou, Houston, TX (US); Chuan-Sheng Huang, Hsinchu (TW); Yung-Sheng Lin, Taipei (TW)

(73) Assignees: NATIONAL TSING HUA UNIVERSITY, Hsinchu (TW); CHANG CHUN PLASTICS CO., LTD., Taipei (TW); CHANG CHUN PETROCHEMICAL CO., LTD., Taipei (TW); DAIREN CHEMICAL CORP., Taipei (TW)

( * ) Notice: Subject to any disclaimer, the term of this patent is extended or adjusted under 35 U.S.C. 154(b) by 115 days.

(21) Appl. No.: 17/741,029

(22) Filed: May 10, 2022

(65) Prior Publication Data
US 2023/0182123 A1 Jun. 15, 2023

(30) Foreign Application Priority Data
Dec. 14, 2021 (TW) ................................. 110146662

(51) Int. Cl.
*C07F 7/28* (2006.01)
*B01J 31/22* (2006.01)
(Continued)

(52) U.S. Cl.
CPC ........... *B01J 31/38* (2013.01); *B01J 31/2213* (2013.01); *C08G 63/672* (2013.01); *C08K 5/005* (2013.01)

(58) Field of Classification Search
CPC ... C07F 7/28; B01J 31/16; B01J 31/22; C08G 63/672
See application file for complete search history.

(56) References Cited

U.S. PATENT DOCUMENTS

2017/0008826 A1* 1/2017 Essaddam ................ C08J 11/24

FOREIGN PATENT DOCUMENTS

| CN | 101773857 A | 7/2010 |
|---|---|---|
| CN | 102497930 A | 6/2012 |

(Continued)

*Primary Examiner* — Caixia Lu
(74) *Attorney, Agent, or Firm* — McBee, Moore & Vanik IP, LLC

(57) ABSTRACT

A titanium catalyst and a synthesizing method of polyester resins are provided in the present disclosure. The titanium catalyst has a chemical structure represented by Formula (I), Formula (II) or Formula (III).

Formula (I)

(Continued)

-continued

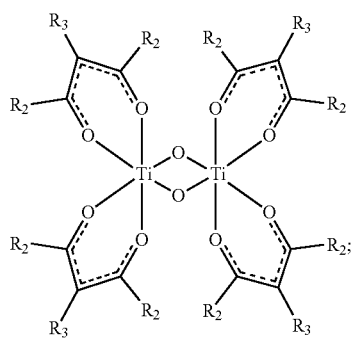

Formula (II)

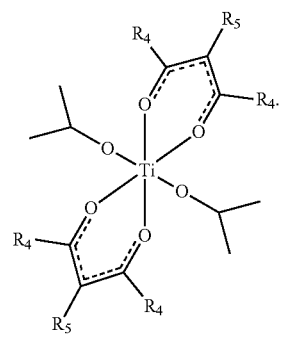

Formula (III)

The symbols shown in the Formula (I), the Formula (II) or the Formula (III) are defined in the description. The synthesizing method of polyester resins includes providing the titanium catalyst, performing a feeding step, performing a heating and pressurizing step and performing a heating and vacuuming step. The titanium catalyst and a heat stabilizer are added into an autoclave before the feeding step or before the heating and vacuuming step.

8 Claims, 15 Drawing Sheets

(51) Int. Cl.
    *B01J 31/38*     (2006.01)
    *C08G 63/672*     (2006.01)
    *C08K 5/00*     (2006.01)

(56) References Cited

FOREIGN PATENT DOCUMENTS

| | | | |
|---|---|---|---|
| CN | 104136564 A | 11/2014 | |
| CN | 104226366 A | 12/2014 | |
| CN | 107417719 A | 12/2017 | |
| CN | 112521592 A | 3/2021 | |
| FR | 2721938 A1 * | 1/1996 | ............. C07F 7/003 |
| TW | I232775 B | 5/2005 | |

* cited by examiner

TITANIUM CATALYST AND SYNTHESIZING POLYESTER RESINS

RELATED APPLICATIONS

This application claims priority to Taiwan Application Serial Number 110146662, filed Dec. 14, 2021, which is herein incorporated by reference.

BACKGROUND

Technical Field

The present disclosure relates to a titanium catalyst and a synthesizing method of polyester resins. More particularly, the present disclosure relates to a titanium catalyst which is able to synthesize polyester resins and reduce the color thereof and a synthesizing method of polyester resins applying the aforementioned titanium catalyst.

Description of Related Art

In order to promote the polymerization reaction of polyester resins, heating is necessary in the conventional synthesizing method thereof. However, the polymerization reaction is a long reacting process under high temperature, and the color of the prepared polyester resins in the autoclave is easily turned yellow due to the high temperature, which further results in the products fabricated from the aforementioned polyester resins have unattractive appearances.

In order to inhibit the yellowing of the polyester resins, catalysts such as titanium catalysts or antimony catalysts are added in the conventional synthesizing method of polyester resins so as to lighten and brighten the color of the polyester resins. However, in terms of accelerating the polymerization reaction and reducing the yellowing phenomenon, the conventional titanium catalysts or conventional antimony catalysts still have a large room for improvement. Therefore, the yellowing problem of the polyester resins, which is a long-lasting problem in the field of the synthesis of the polyester resins, has not been solved.

Due to the aforementioned problems, developing a titanium catalyst with good performance in accelerating the polymerization reaction and reducing the yellowing phenomenon is an important goal in related industries.

SUMMARY

According to one aspect of the present disclosure, a titanium catalyst has a chemical structure shown as Formula (I), Formula (II) or Formula (III):

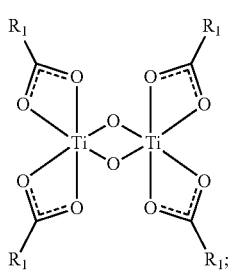

Formula (I)

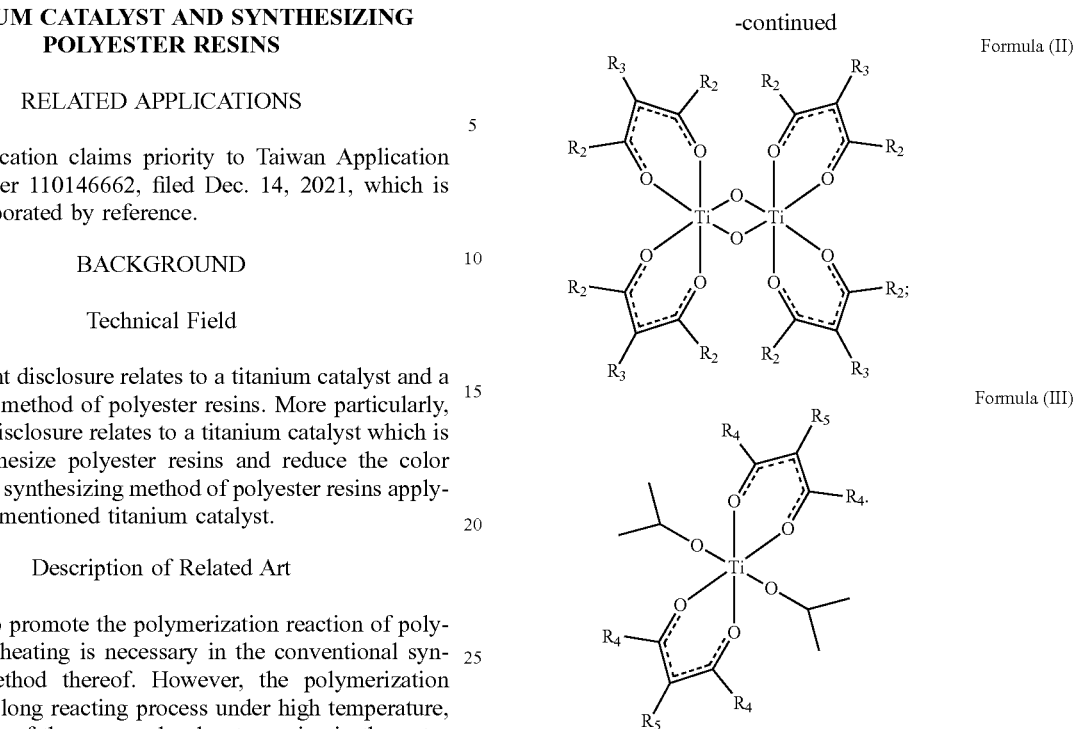

Each of the $R_1$ in the Formula (I) is independently an n-propyl group, an isopropyl group, a phenyl group, a 3,5-xylyl group, a group shown as Formula (MAI), a group shown as Formula (MAII) or a group shown as Formula (MAIII):

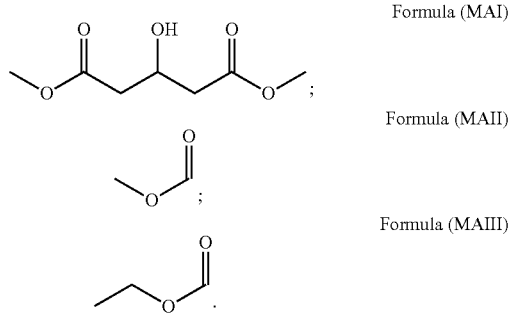

Each of the $R_2$ in the Formula (II) is independently a methyl group, a phenyl group, a trifluoromethyl group or an ethyl group, each of the $R_3$ in the Formula (II) is independently a hydrogen or an n-propyl group, and the $R_2$ and the $R_3$ are not simultaneously the methyl group and the hydrogen, respectively. Each of the $R_4$ in the Formula (III) is independently a methyl group, an ethyl group or a phenyl group, each of the $R_5$ in the Formula (III) is independently a hydrogen, an n-propyl group or an n-pentyl group.

According to another aspect of the present disclosure, a synthesizing method of polyester resins includes providing the titanium catalyst according to the aforementioned aspect, performing a feeding step, performing a heating and pressurizing step and performing a heating and vacuuming step. In the feeding step, a reaction monomer is added into an autoclave, the reaction monomer includes a dicarboxylic acid monomer and a diol monomer, a number of carbon atoms of the dicarboxylic acid monomer is less than 20, and a number of carbon atoms of the diol monomer is less than 20. In the heating and pressurizing step, the autoclave is set in a first heating state and a pressurizing state so as to carry out an esterification reaction. In the heating and vacuuming step, the autoclave is set in a second heating state and is vacuumed to a vacuum state so as to carry out a polymerization reaction. The titanium catalyst and a heat stabilizer are added into the autoclave before the feeding step or before the heating and vacuuming step.

BRIEF DESCRIPTION OF THE DRAWINGS

The present disclosure can be more fully understood by reading the following detailed description of the embodiment, with reference made to the accompanying drawings as follows.

DETAILED DESCRIPTION

In the present disclosure, the compound structure can be represented by a skeleton formula, and the representation can omit the carbon atom, the hydrogen atom and the carbon-hydrogen bond. In the case that the functional group is depicted clearly in the structural formula, the depicted one is preferred.

In the present disclosure, in order to concise and smooth, "functional group includes a structure represented by Formula (MAI)" can be represented as a functional group represented by Formula (MAI) or a functional group (MAI) in some cases, and the other compounds or groups can be represented in the same manner.

<Titanium Catalyst>

According to one aspect of the present disclosure, a titanium catalyst has a chemical structure shown as Formula (I), Formula (II) or Formula (III):

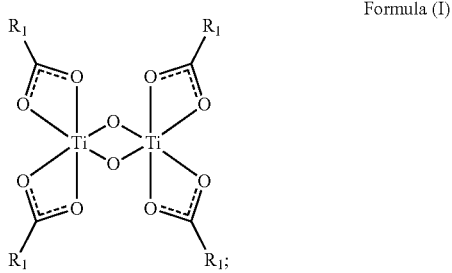

Formula (I)

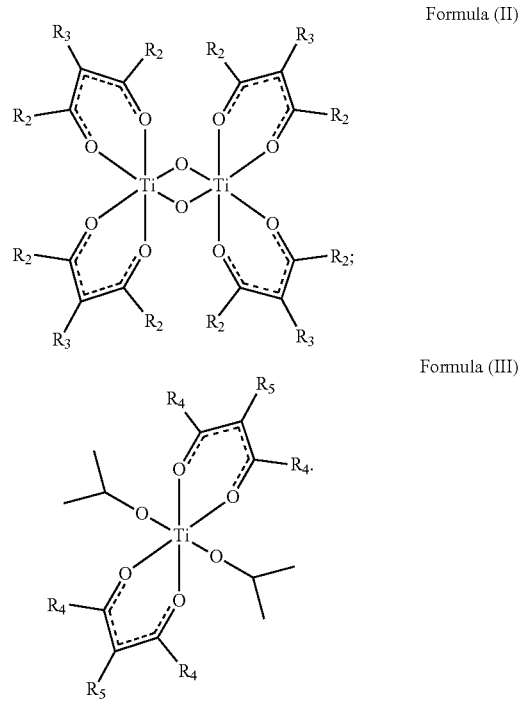

Formula (II)

Formula (III)

Each of the $R_1$ in the Formula (I) is independently an n-propyl group, an isopropyl group, a phenyl group, a 3,5-xylyl group, a group shown as Formula (MAI), a group shown as Formula (MAII) or a group shown as Formula (MAIII):

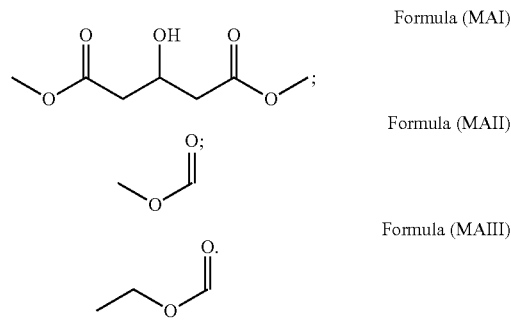

Formula (MAI)

Formula (MAII)

Formula (MAIII)

Each of the $R_2$ in the Formula (II) is independently a methyl group, a phenyl group, a trifluoromethyl group or an ethyl group, each of the $R_3$ in the Formula (II) is independently a hydrogen or an n-propyl group, and the $R_2$ and the $R_3$ are not simultaneously the methyl group and the hydrogen, respectively. Each of the $R_4$ in the Formula (III) is independently a methyl group, an ethyl group or a phenyl group, each of the $R_5$ in the Formula (III) is independently a hydrogen, an n-propyl group or an n-pentyl group.

<Synthesizing Method of Polyester Resins>

Figure 1:
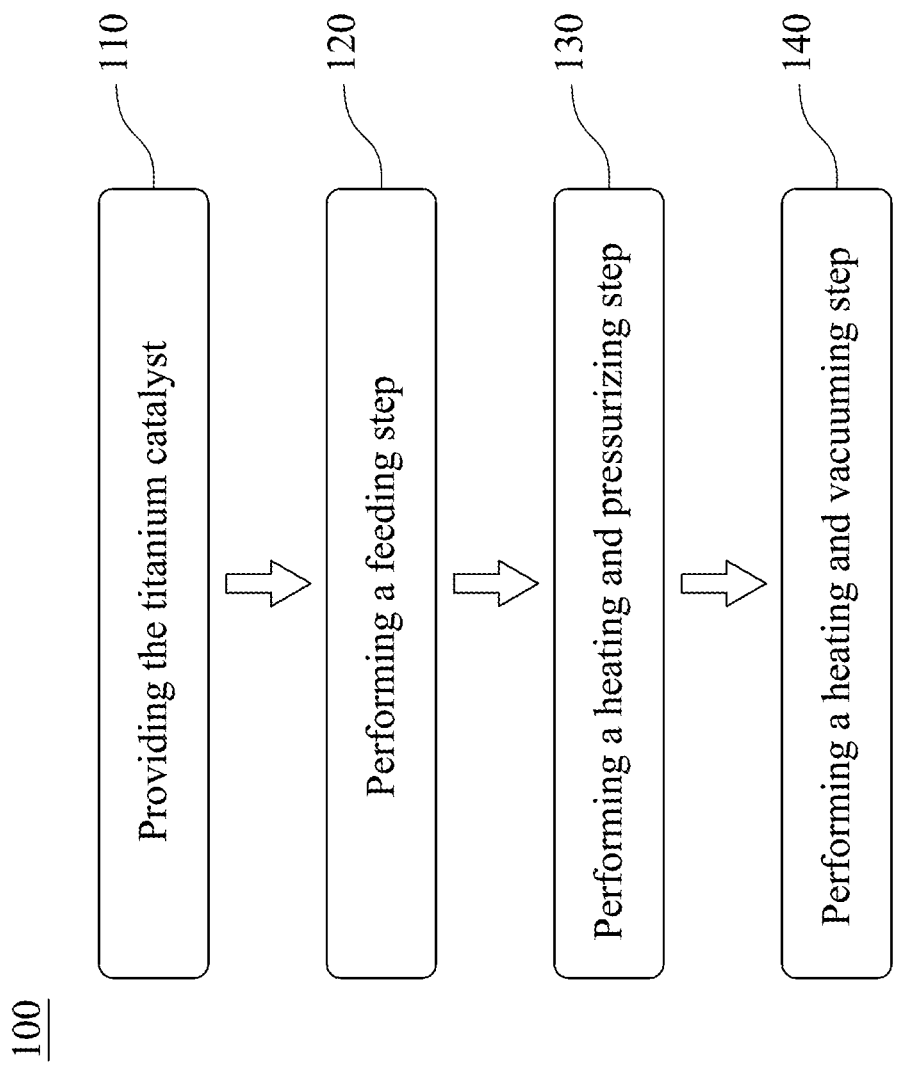
FIG. 1 is a processing flow diagram of a synthesizing method of polyester resins according to the present disclosure.

Please refer to FIG. 1, which is a processing flow diagram of a synthesizing method of polyester resins 100 according to the present disclosure. The synthesizing method of polyester resins 100 includes a step 110, a step 120, a step 130 and a step 140.

In the step 110, a titanium catalyst according to the aforementioned aspect is provided. The chemical structures and the definitions of the symbols are described previously and will not be described herein.

In the step 120, a feeding step is performed. A reaction monomer is added into an autoclave, the reaction monomer includes a dicarboxylic acid monomer and a diol monomer, a number of carbon atoms of the dicarboxylic acid monomer is less than 20, and a number of carbon atoms of the diol monomer is less than 20. In detail, the dicarboxylic acid monomer applied in the synthesizing method of polyester resins 100 can be terephthalic acid (PTA), isophthalic acid (IPA), 2,6-naphthalenedicarboxylic acid (NDA), adipic acid, succinic acid or a mixture thereof. The diol monomer applied in the synthesizing method of polyester resins 100 can be ethylene glycol (EG), 1,4-butanediol (BDO), 1,3-propanediol (PDO), 1,4-cyclohexanedimethanol (CHDM), 2-methyl-1,3-propanediol (MPDO), neopentyl glycol (NPG), 2,2,4,4-tetramethyl-1,3-cyclobutanediol (CBDO), bis(hydroxymethyl)tricyclodecane (TCDDM), isosorbide or a mixture thereof, but the present disclosure is not limited thereto.

In the step 130, a heating and pressurizing step is performed. The autoclave is set in a first heating state and a pressurizing state so as to carry out an esterification reaction. In detail, a temperature range of the first heating state can be room temperature to 270° C., and a pressure range of the pressurizing state can be 0 atm to 6 atm. Further, the pressure range of the pressurizing state can be 0 atm to 4 atm, but the present disclosure is not limited thereto.

In the step 130, the dicarboxylic acid monomer and the diol monomer carry out the esterification reaction, and water (or alcohol) is formed as a by-product of the esterification reaction. Therefore, the moment to stop the esterification reaction can be determined by collecting and measuring the forming amount of the by-product so as to perform the step 140. Moreover, the titanium catalyst and a heat stabilizer are added into the autoclave before performing the step 120 or before performing the step 140. In detail, in the synthesizing method of polyester resins 100, the aforementioned heat stabilizer can be phosphonic acid, phosphorous acid, hypophosphorous acid, phosphoric ester or a salt thereof, but the present disclosure is not limited thereto. Moreover, the synthesizing method of polyester resins 100 can further include providing a promoter, which can be added into the autoclave before performing the step 120 or before performing the step 140. The aforementioned promoter can be copper (II) acetate, zinc acetate, sodium acetate or potassium acetate, but the present disclosure is not limited thereto.

In the step 140, a heating and vacuuming step is performed. The autoclave is set in a second heating state and is vacuumed to a vacuum state so as to carry out a polymerization reaction. A temperature range of the second heating state can be 250° C. to 300° C. The autoclave is vacuumed under the aforementioned temperature range till the vacuum state, and a pressure range of the vacuum state can be less than 3 torr. Further, the pressure range of the vacuum state can be less than 1 torr, but the present disclosure is not limited thereto.

In particular, in the step 140, the esters formed in the step 130 carry out the polymerization reaction, and the viscosity of the polyester resins will be enhanced gradually as the polymerization reaction proceeds. Therefore, the moment as the reaction stops can be determined by measuring the value of the viscosity (IV) of the polyester resins.

The polyester resins which is synthesized by the synthesizing method of polyester resins 100 can be polyethylene terephthalate (PET), polybutylene terephthalate (PBT), PET modified by CBDO (PETM), PET modified by TCDDM (PETT), polybutylene succinate (PBS), polybutylene adipate terephthalate (PBAT) or poly(ethylene terephthalate-co-1,4-cyclohexylenedimethylene terephthalate) (PECT), but the present disclosure is not limited thereto.

In detail, the titanium catalyst according to the aforementioned aspect of the present disclosure is a compound with properties of Lewis acid. Therefore, the titanium catalyst is able to activate the reaction monomer, accelerate the reaction rate of the polymerization reaction and reduce the yellowing phenomenon of the polyester resins. Further, the functional groups of the titanium catalyst can be adjusted so as to optimize the efficacy of the titanium catalyst. Therefore, the titanium catalyst can be applied for synthesizing process of the polyester resins and be able to obtain polyester resins with lighter color in a shorter polymerization reaction time.

In order to further demonstrate and describe the present disclosure, the following tests are performed. The following tests are favorable for person having ordinary skill in the art to completely apply and embody the present disclosure. However, the following tests should not be regarded as the limitation of the present disclosure but is for describing the material or method of embodying the present disclosure.

TEST EXAMPLES

Test 1. Structure Identification of the Titanium Catalyst of the Present Disclosure Please refer to Table 1, which shows the structural formulas of the examples of the titanium catalyst of the present disclosure, and the examples are sequentially labeled as Formula (IA) to Formula (IIC-H).

TABLE 1

| Example | Formula | Structural formulas |
|---|---|---|
| 1 | Formula (IA) | 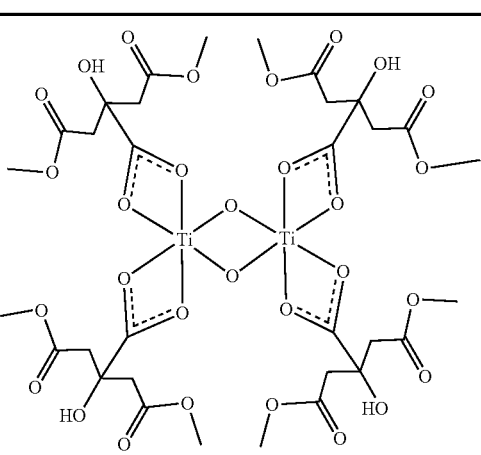 |

TABLE 1-continued

| Example | Formula | Structural formulas |
|---|---|---|
| 2 | Formula (IB) | |
| 3 | Formula (IC) | |
| 4 | Formula (ID) | |
| 5 | Formula (IE) | |

TABLE 1-continued

| Example | Formula | Structural formulas |
|---|---|---|
| 6 | Formula (IF) | |
| 7 | Formula (IG) | |
| 8 | Formula (IIA-H) | |
| 9 | Formula (IIB-H) | |

TABLE 1-continued
| Example | Formula | Structural formulas |
|---|---|---|
| 10 | Formula (IIC-H) | 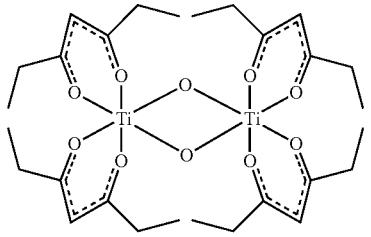 |
| 11 | Formula (IID-Pr) | 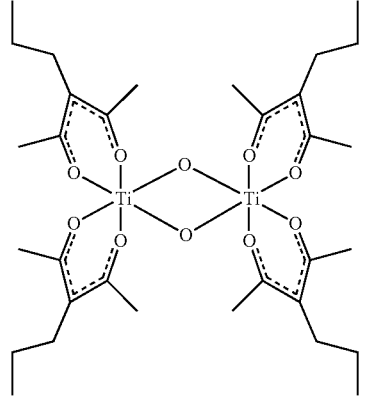 |
| 12 | Formula (IIIA-Pr) | 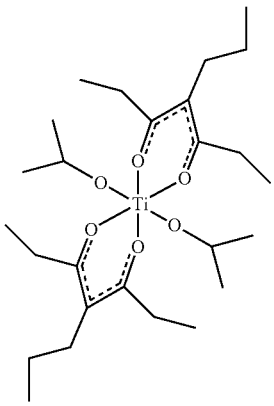 |
| 13 | Formula (IIIB-Pen) | 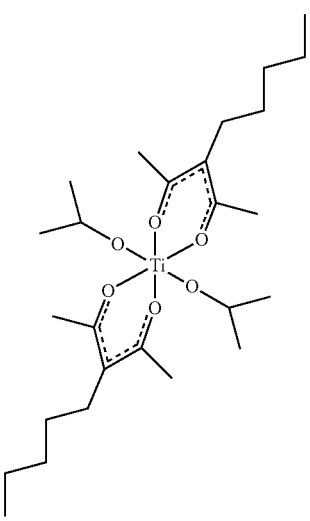 |

TABLE 1-continued

| Example | Formula | Structural formulas |
|---|---|---|
| 14 | Formula (IIIC-H) | 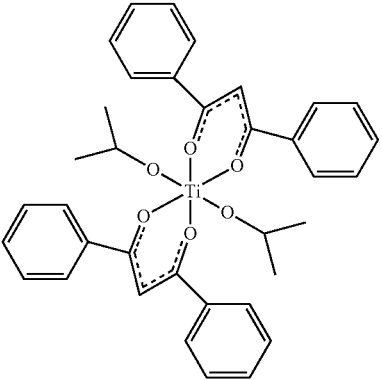 |

According to Table 1, when the $R_1$ in the Formula (I) is the group shown as the Formula (MAI), a titanium catalyst having a chemical structure shown as the Formula (IA) can be obtained (example 1). When the $R_1$ in the Formula (I) is the group shown as the Formula (MAII), a titanium catalyst having a chemical structure shown as the Formula (IB) can be obtained (example 2). When the $R_1$ in the Formula (I) is the group shown as the Formula (MAIII), a titanium catalyst having a chemical structure shown as the Formula (IC) can be obtained (example 3). When the $R_1$ in the Formula (I) is the n-propyl group, a titanium catalyst having a chemical structure shown as the Formula (ID) can be obtained (example 4). When the $R_1$ in the Formula (I) is the isopropyl group, a titanium catalyst having a chemical structure shown as the Formula (IE) can be obtained (example 5). When the $R_1$ in the Formula (I) is the phenyl group, a titanium catalyst having a chemical structure shown as the Formula (IF) can be obtained (example 6). When the $R_1$ in the Formula (I) is the 3,5-xylyl group, a titanium catalyst having a chemical structure shown as the Formula (IG) can be obtained (example 7). When the $R_2$ in the Formula (II) is the phenyl group and the $R_3$ in the Formula (II) is the hydrogen, a titanium catalyst having a chemical structure shown as the Formula (IIA-H) can be obtained (example 8). When the $R_2$ in the Formula (II) is the trifluoromethyl group and the $R_3$ in the Formula (II) is the hydrogen, a titanium catalyst having a chemical structure shown as the Formula (IIB-H) can be obtained (example 9). When the $R_2$ in the Formula (II) is the ethyl group and the $R_3$ in the Formula (II) is the hydrogen, a titanium catalyst having a chemical structure shown as the Formula (IIC-H) can be obtained (example 10). When the $R_2$ in the Formula (II) is the methyl group and the $R_3$ in the Formula (II) is the n-propyl group, a titanium catalyst having a chemical structure shown as the Formula (IID-Pr) can be obtained (example 11). When the $R_4$ in the Formula (III) is the ethyl group and the $R_5$ in the Formula (III) is the n-propyl group, a titanium catalyst having a chemical structure shown as the Formula (IIIA-Pr) can be obtained (example 12). When the $R_4$ in the Formula (III) is the methyl group and the $R_5$ in the Formula (III) is the n-pentyl group, a titanium catalyst having a chemical structure shown as the Formula (IIIB-Pen) can be obtained (example 13). When the $R_4$ in the Formula (111) is the phenyl group and the $R_5$ in the Formula (III) is the hydrogen, a titanium catalyst having a chemical structure shown as the Formula (IIIC-H) can be obtained (example 14). The synthesizing method of each example of the titanium catalyst will be roughly described in the following paragraph.

The synthesizing method of the example 1 of the present disclosure is shown as follows. First, titanium (IV) isopropoxide (2 g), 1,5-dimethyl citrate (3.1 g) and tetrahydrofuran (10 mL) are mixed and stirred for 8 hours until the solution becomes transparent, and deionized water (0.2 g) is subsequently added into the solution. Then, the solution is heated to 90° C. and stirred for 12 hours until colorless suspending product is formed. Finally, the product is rinsed by diethyl ether and the liquid of the product is drained so as to obtain the titanium catalyst of example 1.

The synthesizing method of the example 2 of the present disclosure is shown as follows. First, titanium (IV) isopropoxide (1 g), dimethyl oxalate (0.73 g) and toluene (10 mL) are mixed and stirred for 4 hours at 60° C. After the chemical reaction is finished, the solution is cooled and the deionized water (0.07 mL) is added into the solution under a nitrogen environment. Subsequently, the solution is heated to 100° C. over one night so as to react the solution. After that, the solution is cooled and filtered to collect white product. Finally, the product is rinsed by diethyl ether and the liquid of the product is drained so as to obtain the titanium catalyst of example 2.

The synthesizing method of the example 3 of the present disclosure is shown as follows. First, titanium (IV) isopropoxide (1 g), diethyl oxalate (0.83 g) and toluene (10 mL) are mixed and stirred for 4 hours at 60° C. After the chemical reaction is finished, the solution is cooled and deionized water (0.07 mL) is added into the solution under a nitrogen environment. Subsequently, the solution is heated to 100° C. over one night so as to react the solution. After that, the solution is cooled and filtered to collect white product. Finally, the product is rinsed by diethyl ether and the liquid of the product is drained so as to obtain the titanium catalyst of example 3.

The synthesizing method of the example 4 of the present disclosure is shown as follows. First, titanium (IV) isopropoxide (1 g), butyric acid (0.77 g) and deionized water (0.07 mL) are mixed and heated to 100° C. to react over one night. After the chemical reaction is finished, the solution is cooled and ethylene glycol (4 mL) is added into the solution. Subsequently, the solution is put into a fridge whose temperature is 4° C. for 3 hours. After that, the solution is filtered so as to collect crystalline product, and the product is rinsed by ethylene glycol (4 mL) for 5 times. Finally, the liquid of the product is drained in high vacuum for 6 hours and the product is put into a drying oven to dry the product so as to obtain the titanium catalyst of example 4.

The synthesizing method of the example 5 of the present disclosure is shown as follows. First, titanium (IV) isopropoxide (1 g), isobutyric acid (0.77 g) and deionized water (0.07 mL) are mixed and heated to 100° C. to react over one night. After the chemical reaction is finished, the solution is cooled and ethylene glycol (4 mL) is added into the solution. Subsequently, the solution is put into a fridge whose temperature is 4° C. for 3 hours. After that, the solution is filtered to collect crystalline product, and the product is rinsed by ethylene glycol (4 mL) for 5 times. Finally, the liquid of the product is drained in high vacuum for 6 hours and the product is put into a drying oven to dry the product so as to obtain the titanium catalyst of example 5.

The synthesizing method of the example 6 of the present disclosure is shown as follows. First, titanium (IV) isopropoxide (1.1 g), benzoic acid (0.95 g) and deionized water (0.07 mL) are mixed and heated to 100° C. to react over one night. After the chemical reaction is finished, the solution is cooled and hexane (4 mL) is added into the solution to precipitate the product. After that, the solution is filtered to collect white product, and the product is rinsed by hexane. Finally, the liquid of the product is drained in high vacuum system so as to obtain the titanium catalyst of example 6.

The synthesizing method of the example 7 of the present disclosure is shown as follows. First, titanium (IV) isopropoxide (1 g), 3,5-dimethylbenzoic acid (1.3 g) and toluene (4 mL) are mixed and heated to 60° C. to react over one night. After the white suspending solution turns into transparent solution, the transparent solution is cooled and 1.05 equivalents of deionized water is added. After that, the transparent solution is heated to 100° C. to react for 12 hours. Finally, the liquid of the product is drained and the product is rinsed by hexane so as to obtain the titanium catalyst of example 7.

The synthesizing method of the example 8 of the present disclosure is shown as follows. First, titanium (IV) isopropoxide (1.1 g), 1,3-diphenyl-1,3-propanedione (1.74 g) and deionized water (0.07 mL) are mixed and heated to 100° C. to react over one night. After the chemical reaction is finished, the solution is cooled and hexane (4 mL) is added into the solution to precipitate the product. After that, the solution is filtered to collect yellow product, and the product is rinsed by hexane. Finally, the liquid of the product is drained in high vacuum system so as to obtain the titanium catalyst of example 8.

The synthesizing method of the example 9 of the present disclosure is shown as follows. First, titanium (IV) isopropoxide (2.02 g), 1,1,1,5,5,5-hexafluoro-2,4-pentanedione (0.95 g) and deionized water (0.14 mL) are mixed and heated to 100° C. to react over one night. After the chemical reaction is finished, the solution is cooled and filtered so as to collect white product. Finally, the white product is rinsed by hexane so as to obtain the titanium catalyst of example 9.

The synthesizing method of the example 10 of the present disclosure is shown as follows. First, titanium (IV) isopropoxide (2.01 g), 3,5-heptanedione (0.95 g) and deionized water (0.14 mL) are mixed and heated to 100° C. to react over one night. After the chemical reaction is finished, the solution is cooled and filtered so as to collect beige product. Finally, the beige product is rinsed by hexane so as to obtain the titanium catalyst of example 10.

The synthesizing method of the example 11 of the present disclosure is shown as follows. First, titanium (IV) isopropoxide (502.1 mg), 3-propyl-2,4-pentanedione (502.4 mg) and hexane (4 mL) are mixed and heated to 60° C. to react over one night. After the chemical reaction is finished, the solution is cooled and 1 equivalent of deionized water is added. After that, the solution is heated to 90° C. to react and stirred for 1 day. Finally, the liquid of the solution is drained at 90° C., and the yellow product is rinsed by hexane so as to obtain the titanium catalyst of example 11.

The synthesizing method of the example 12 of the present disclosure is shown as follows. First, titanium (IV) isopropoxide (502.3 mg), 4-propylheptane-3,5-dione (610.2 mg) and toluene (4 mL) are mixed and heated to 90° C. to react for 1 hour. Subsequently, the reaction system is turned into an open system to vaporize isopropanol, which is a by-product of the reaction. After the chemical reaction is finished, the toluene is removed from the solution by vacuum system, and the yellow oil-like product is collected so as to obtain the titanium catalyst of example 12.

The synthesizing method of the example 13 of the present disclosure is shown as follows. First, titanium (IV) isopropoxide (503.6 mg), 3-n-pentyl-2,4-pentanedione (601.2 mg) and toluene (4 mL) are mixed and heated to 90° C. to react for 1 hour. Subsequently, the reaction system is turned into an open system to vaporize isopropanol, which is a by-product of the reaction. After the chemical reaction is finished, the toluene is removed from the solution by vacuum system, and the yellow oil-like product is collected so as to obtain the titanium catalyst of example 13.

The synthesizing method of the example 14 of the present disclosure is shown as follows. First, titanium (IV) isopropoxide (200 mg) and 1,3-diphenyl-1,3-propanedione (323.5 mg) are mixed and heated to 100° C. to react for 10 hours. After the chemical reaction is finished, the liquid of the solution is drained and the fluorescent yellow product is collected so as to obtain the titanium catalyst of example 14.

Figure 2:
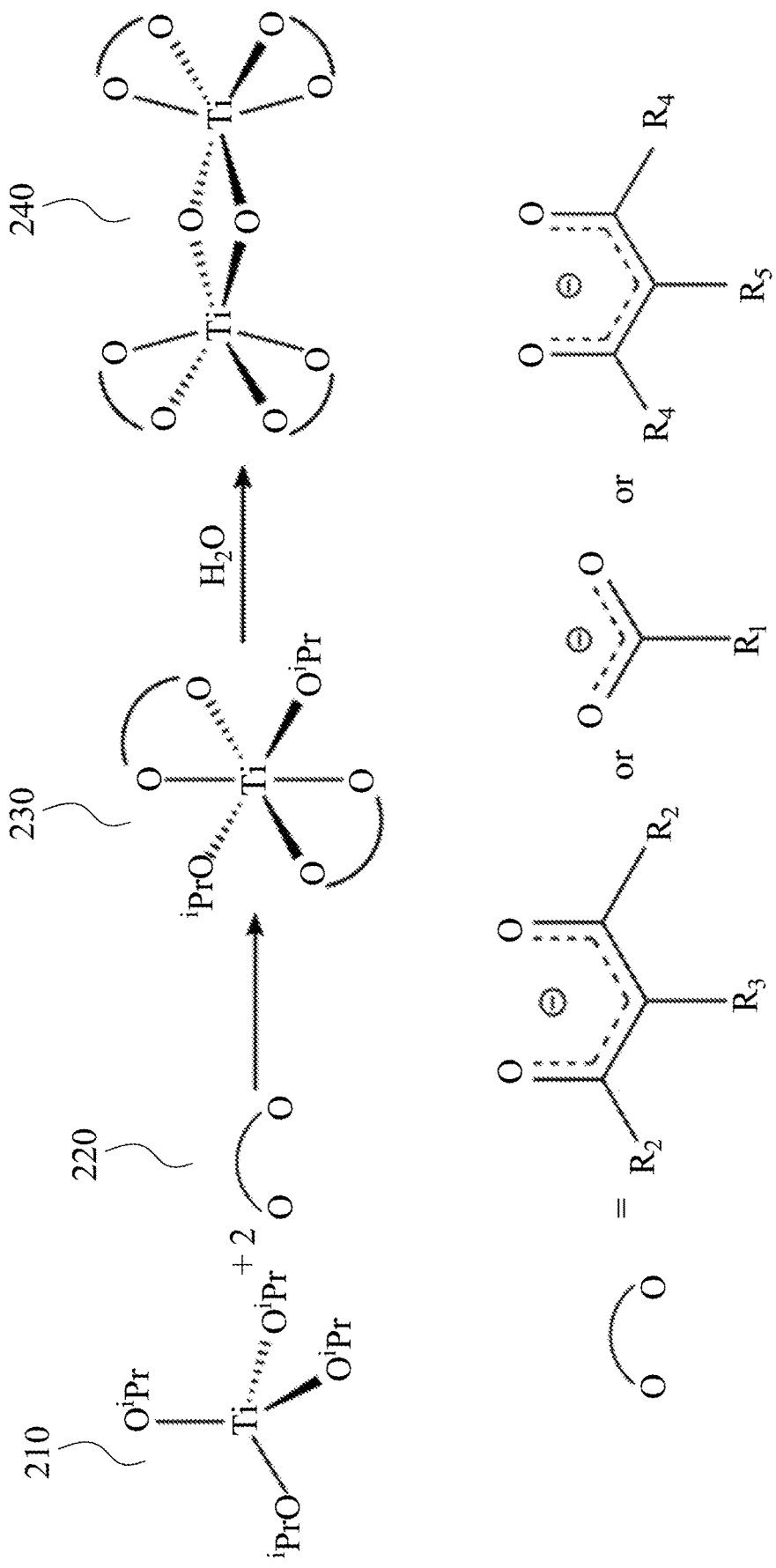
FIG. 2 is a simplified synthesizing equation of a titanium catalyst according to the present disclosure.
Figure 3A:
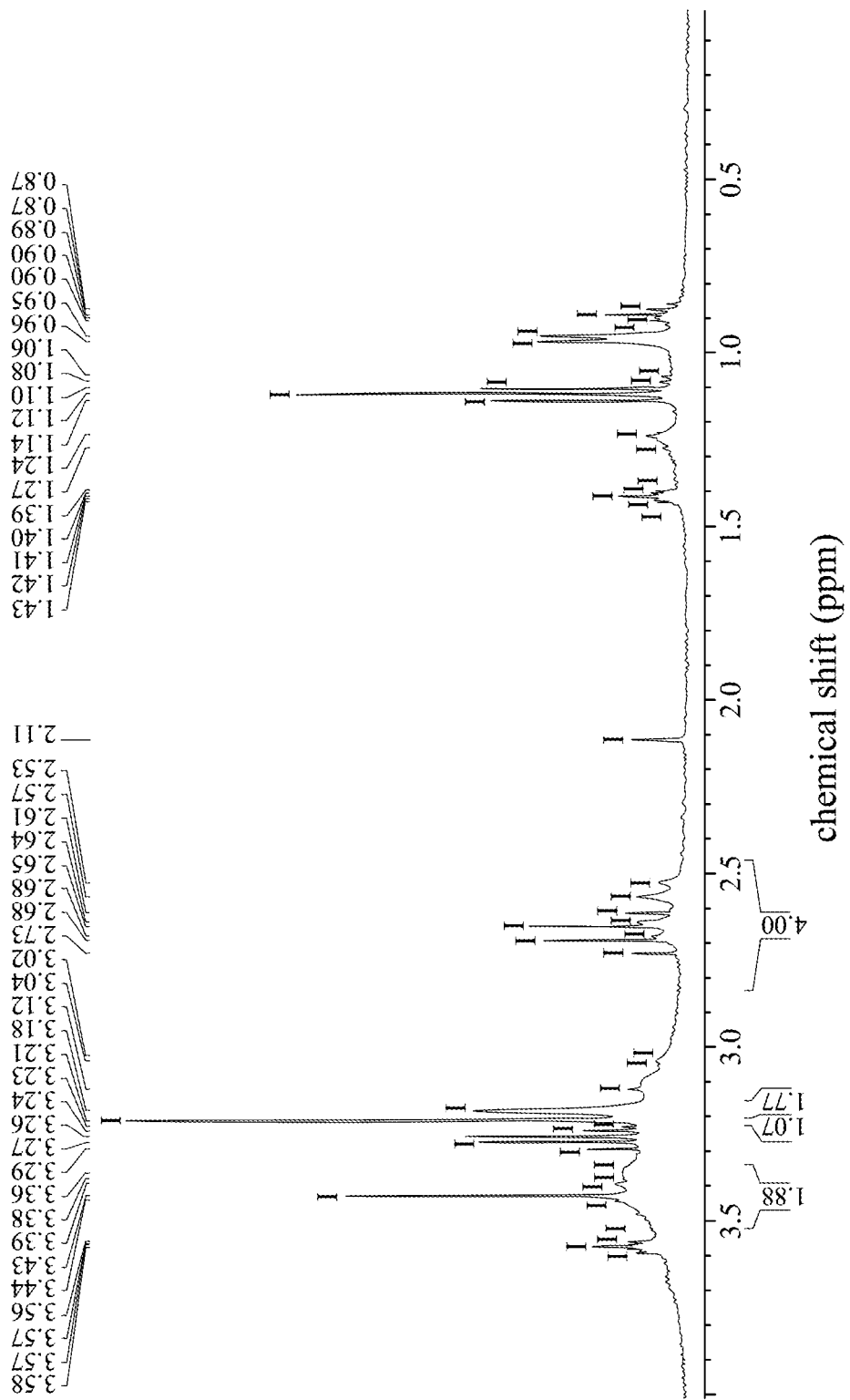
FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, and FIG. 3M are nuclear magnetic resonance spectroscopy diagrams of the reaction intermediate of example 1, the reaction intermediate of example 2, the reaction intermediate of example 3, the reaction intermediate of example 4, the reaction intermediate of example 5, the reaction intermediate of example 6, the reaction intermediate of example 7, the example 14, the reaction intermediate of example 9, the reaction intermediate of example 10, the reaction intermediate of example 11, the example 12 and the example 13, respectively.
Figure 3B:
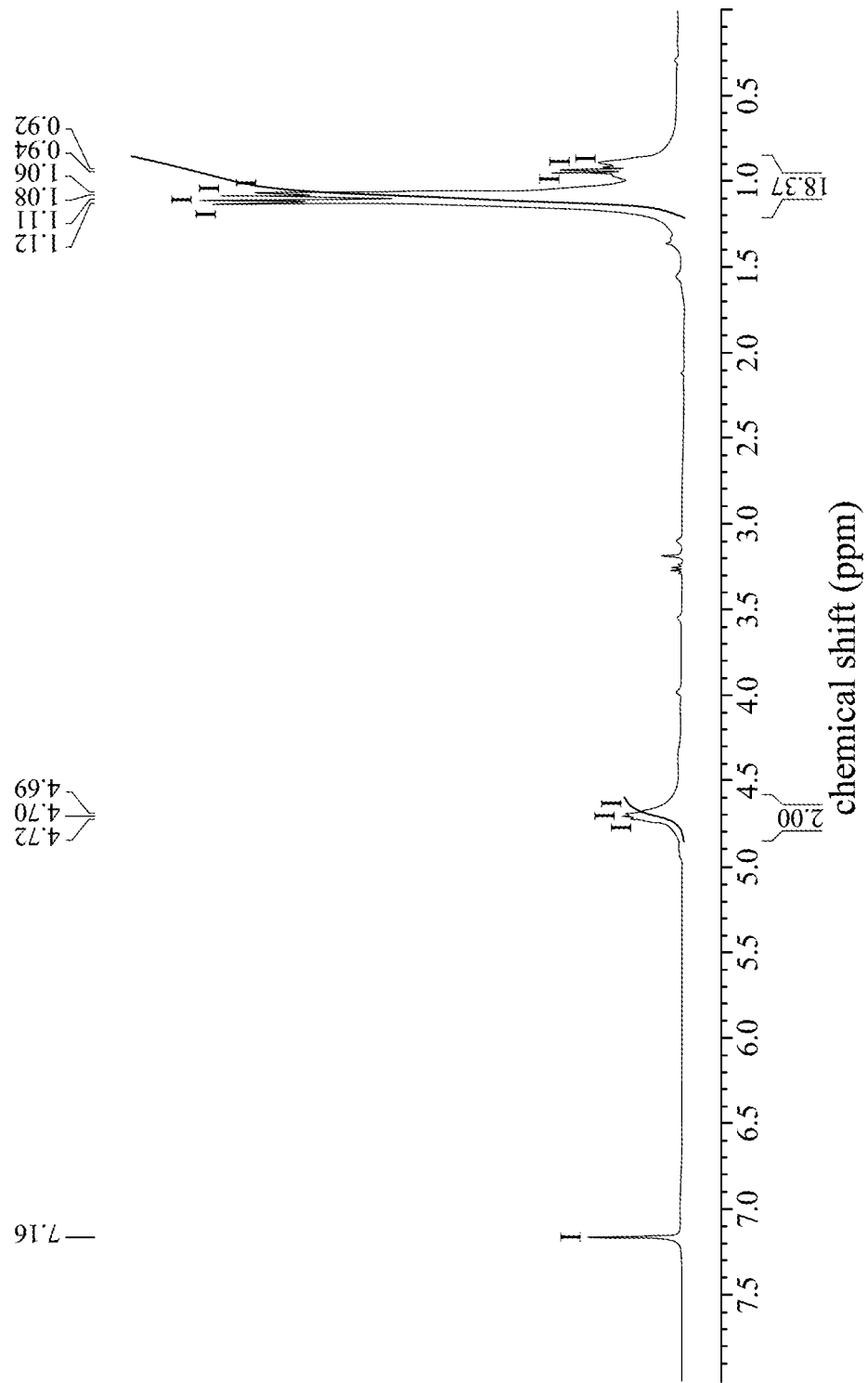
Figure 3C:
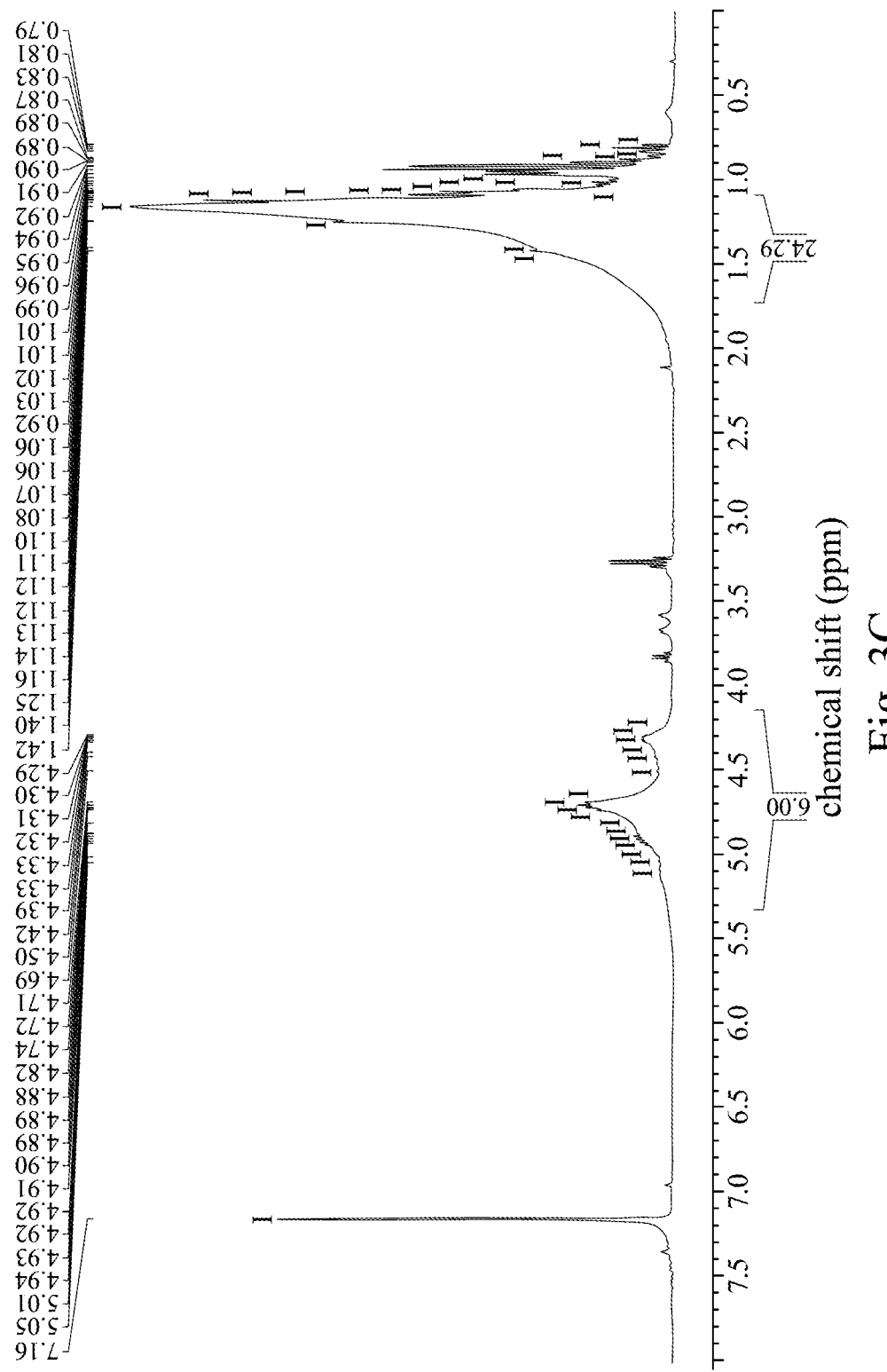
Figure 3D:
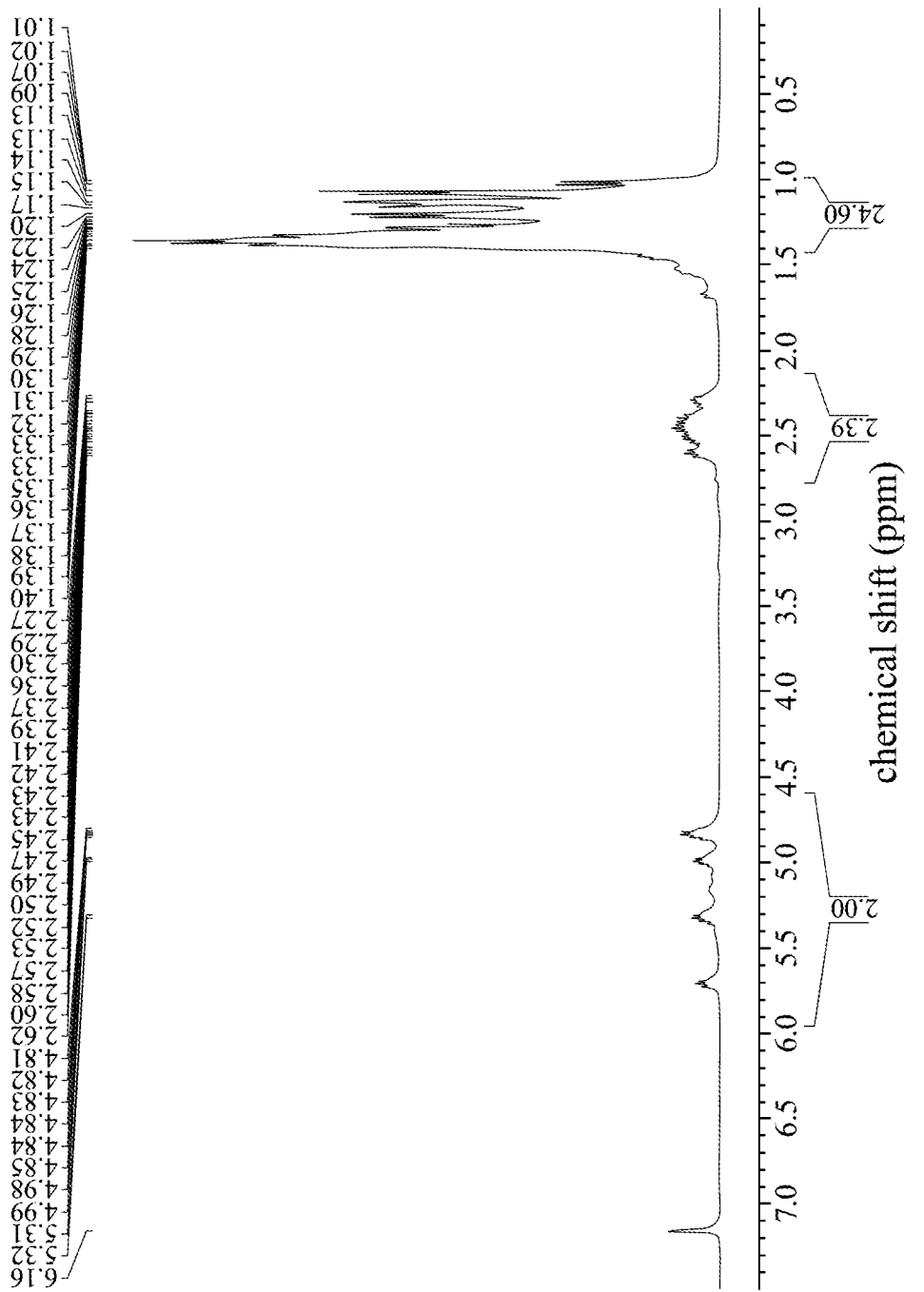
Figure 3E:
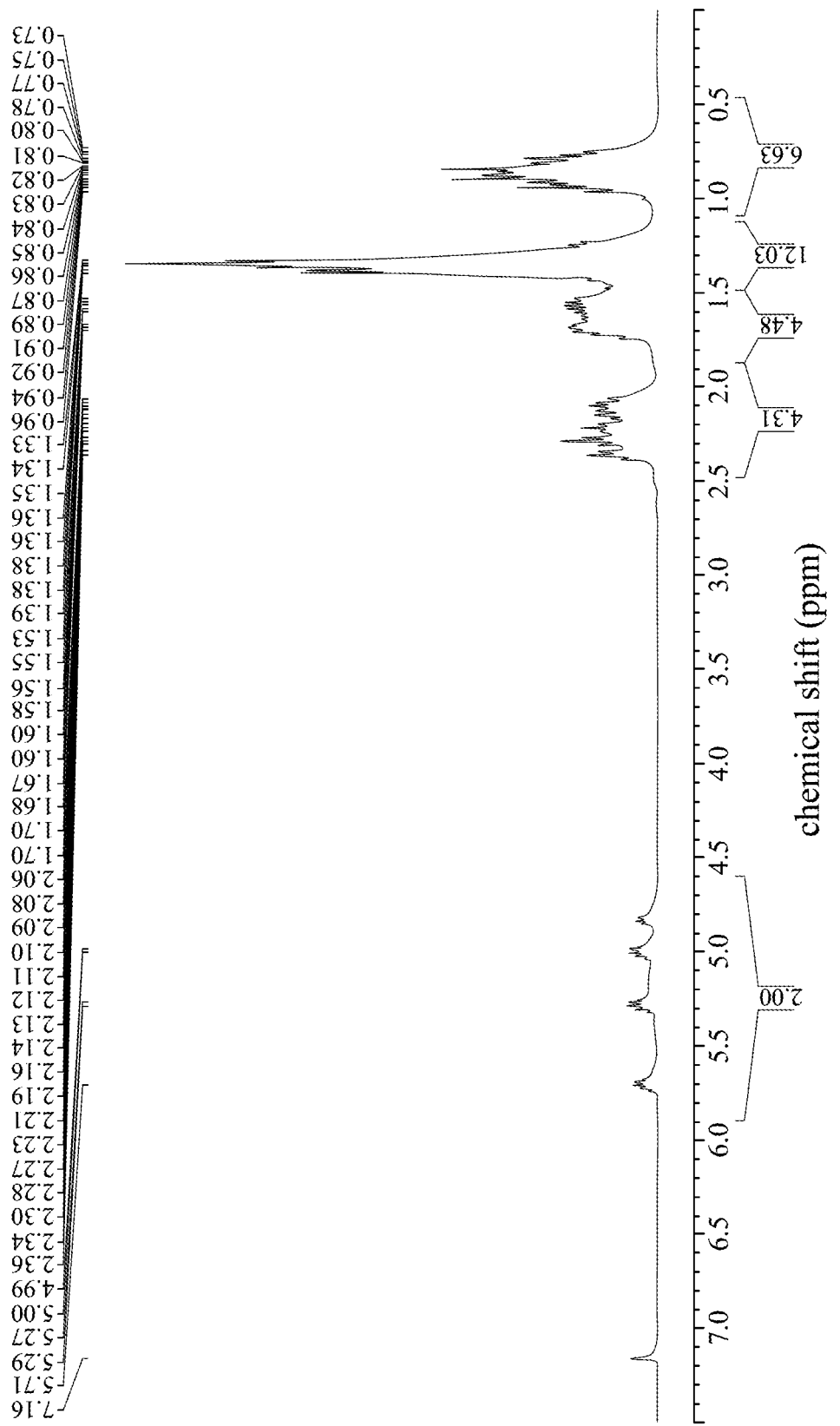
Figure 3F:
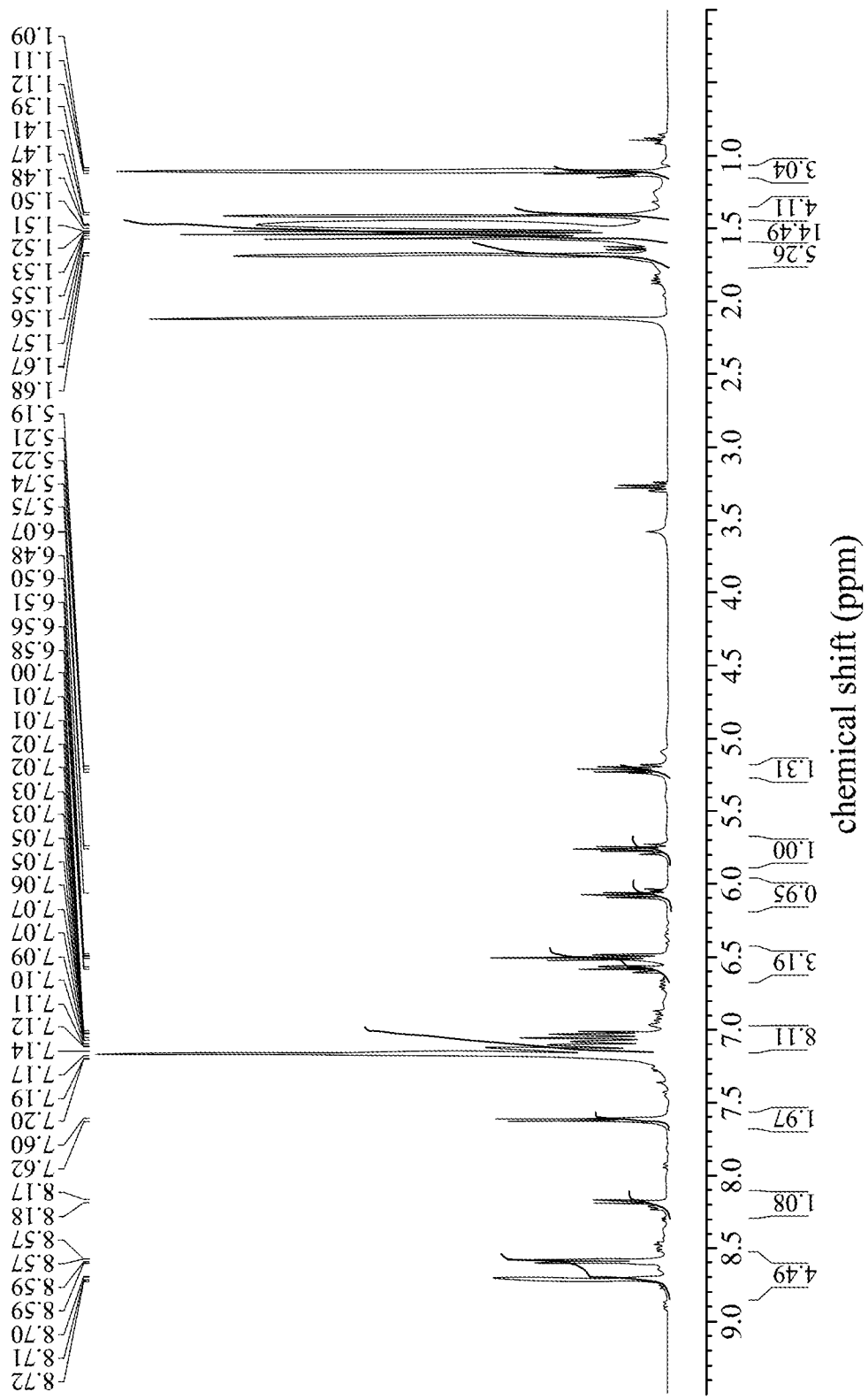
Figure 3G:
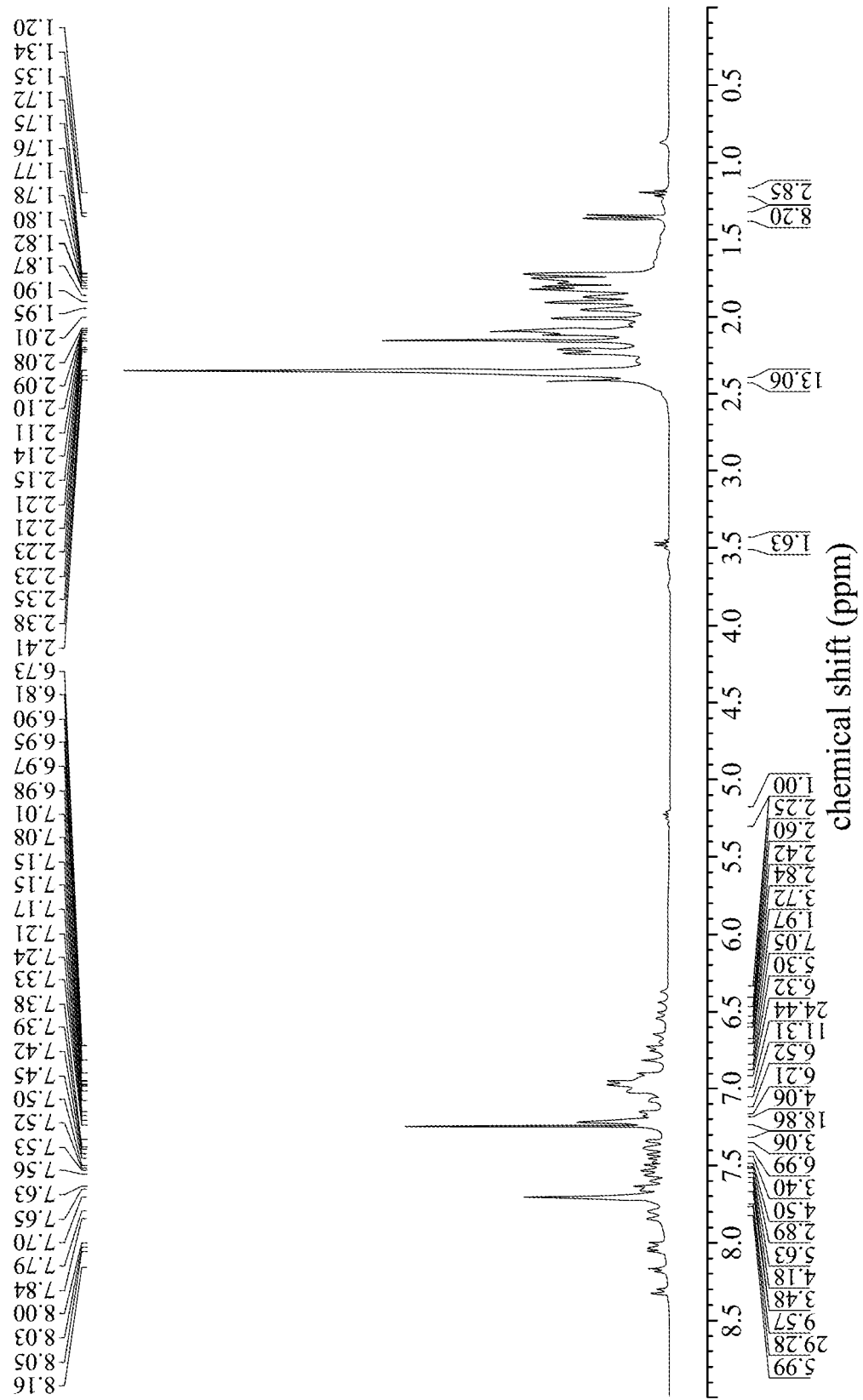
Figure 3H:
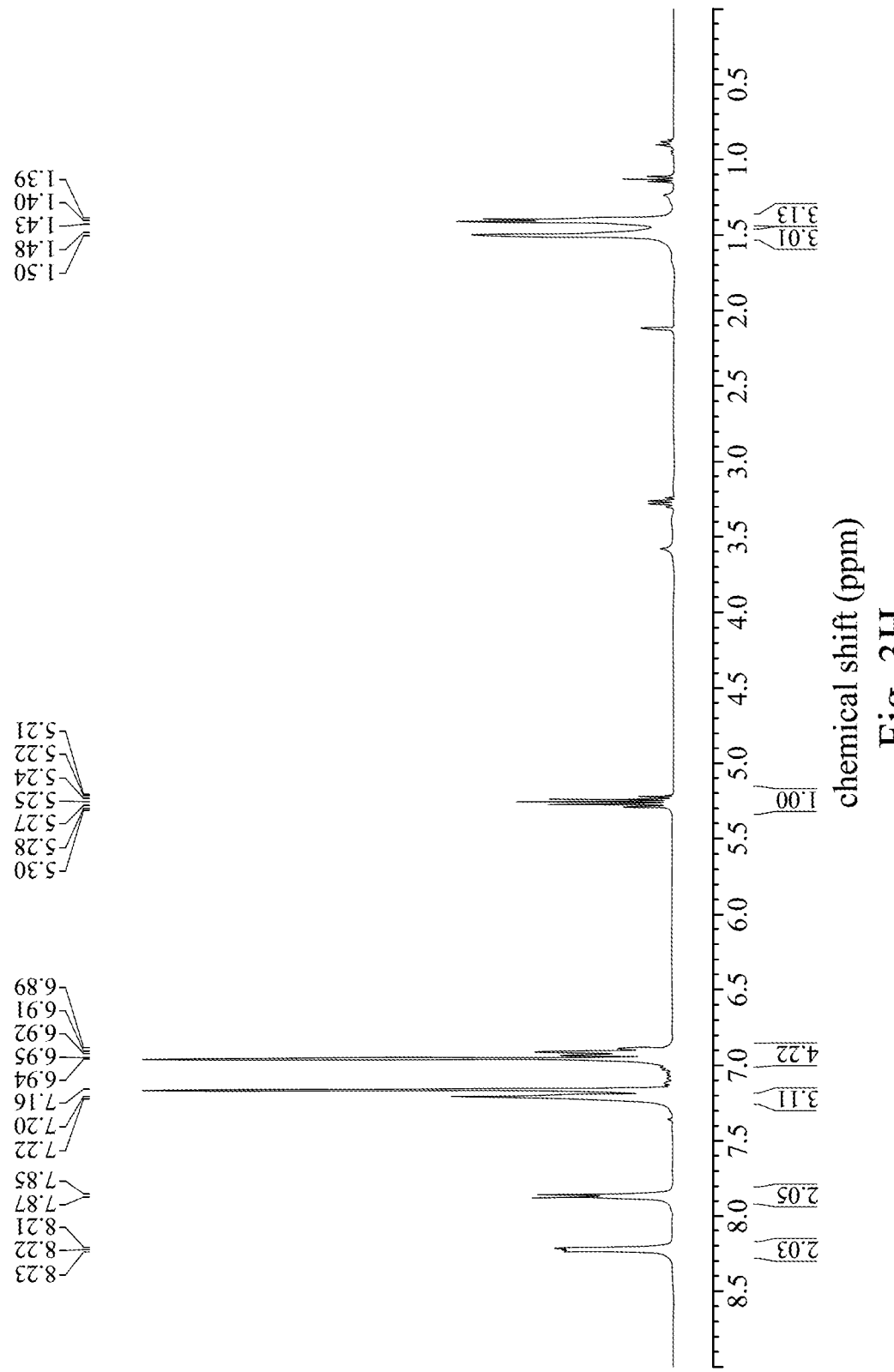
Figure 3I:
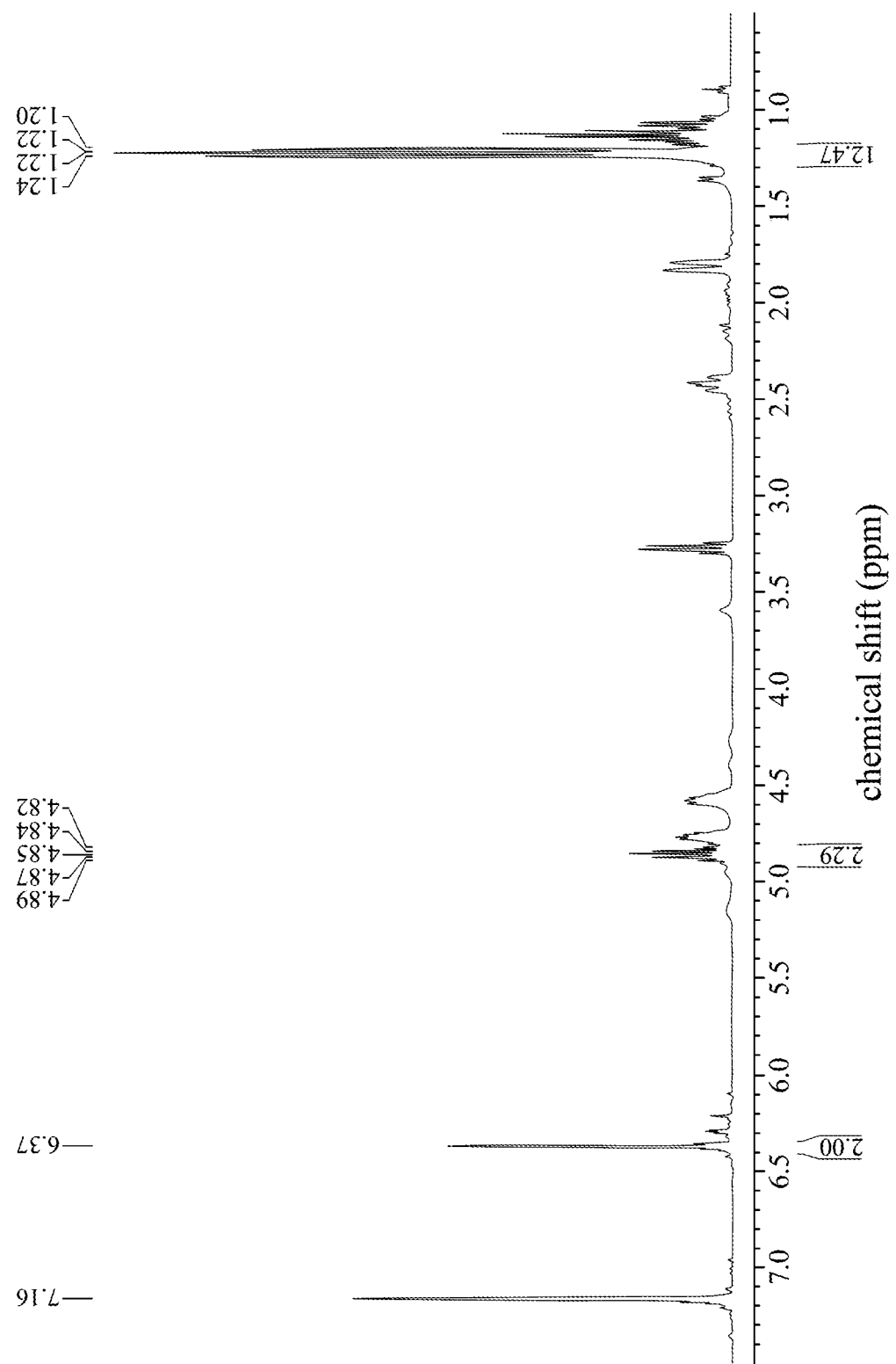
Figure 3J:
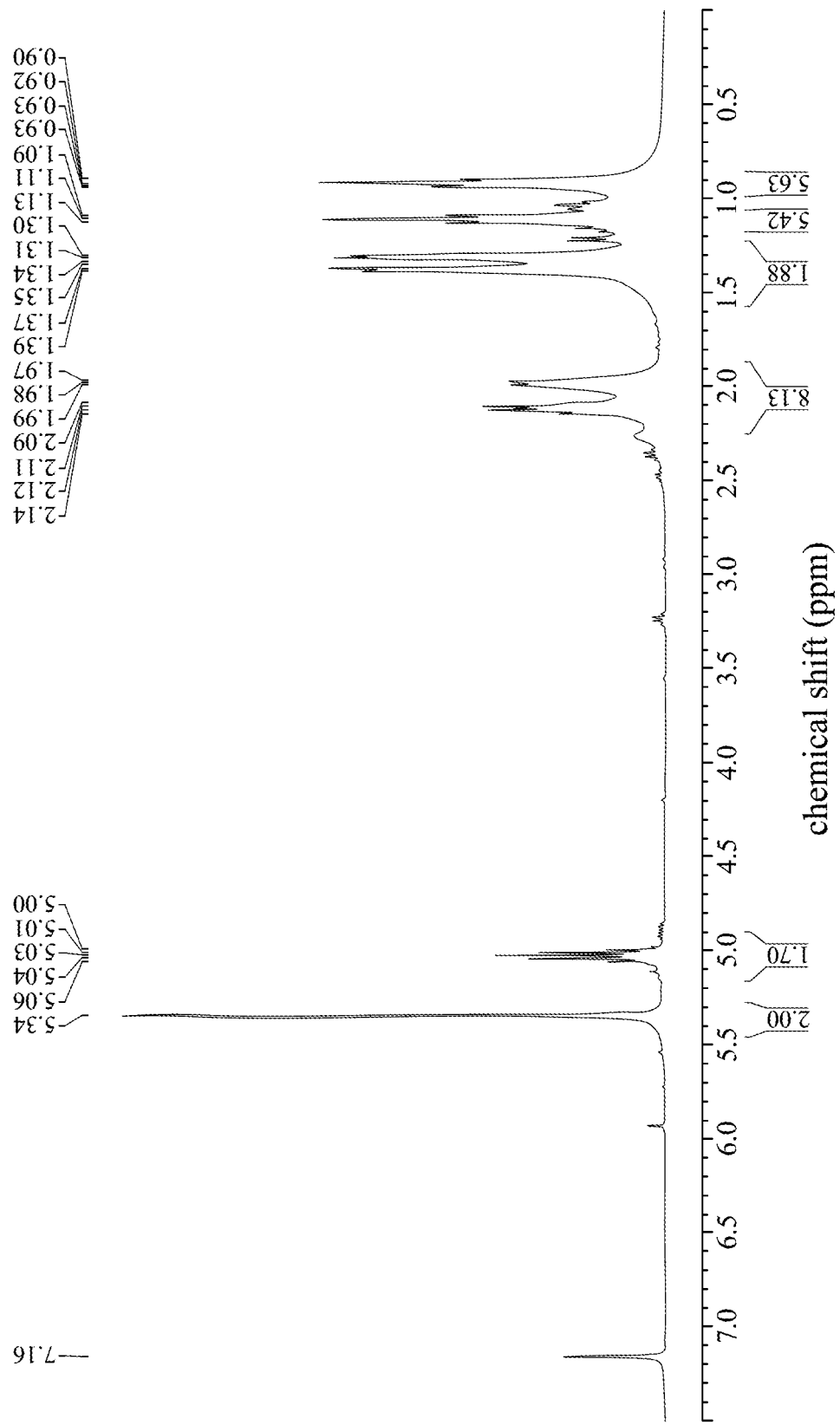
Figure 3K:
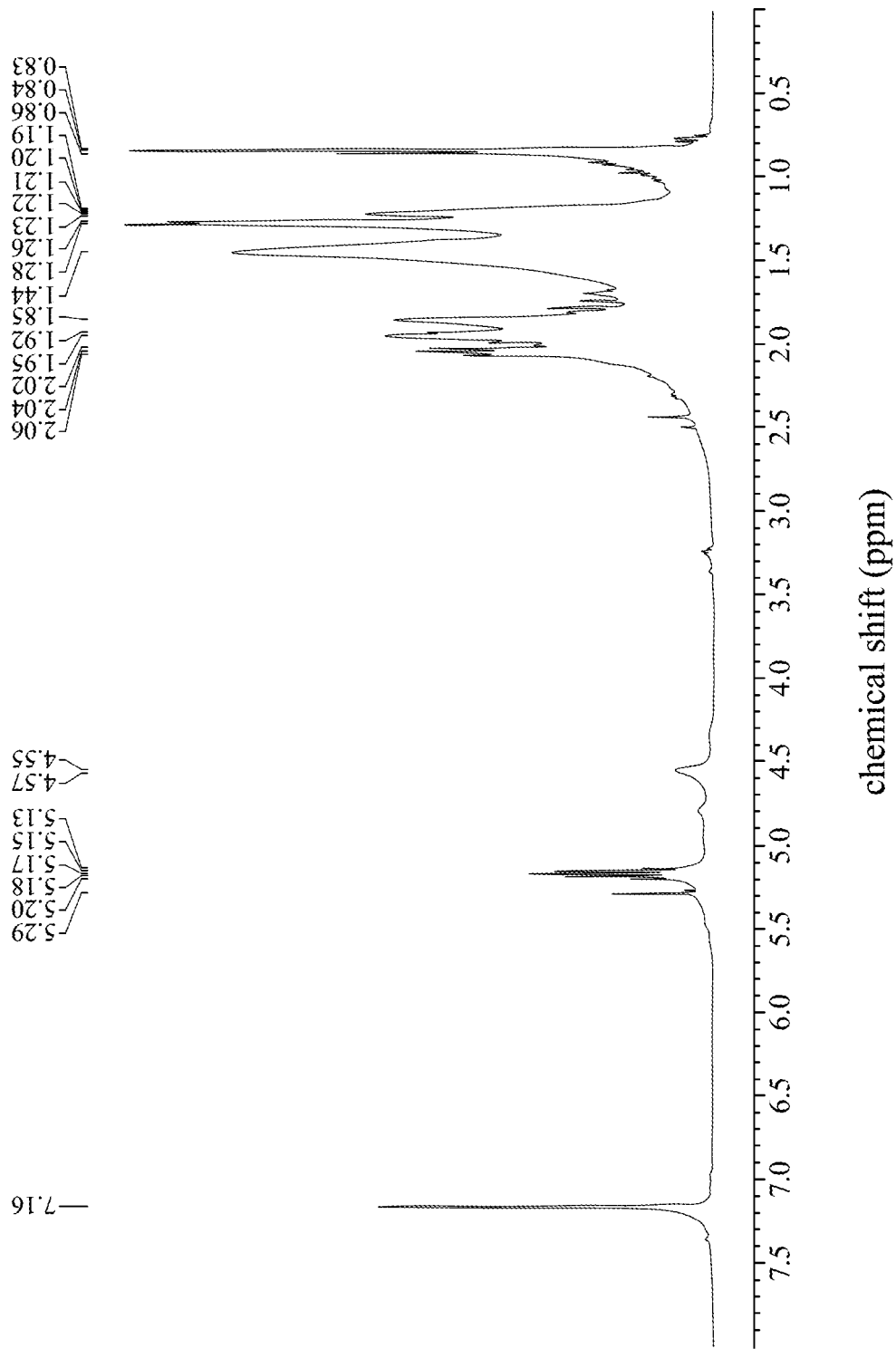
Figure 3L:
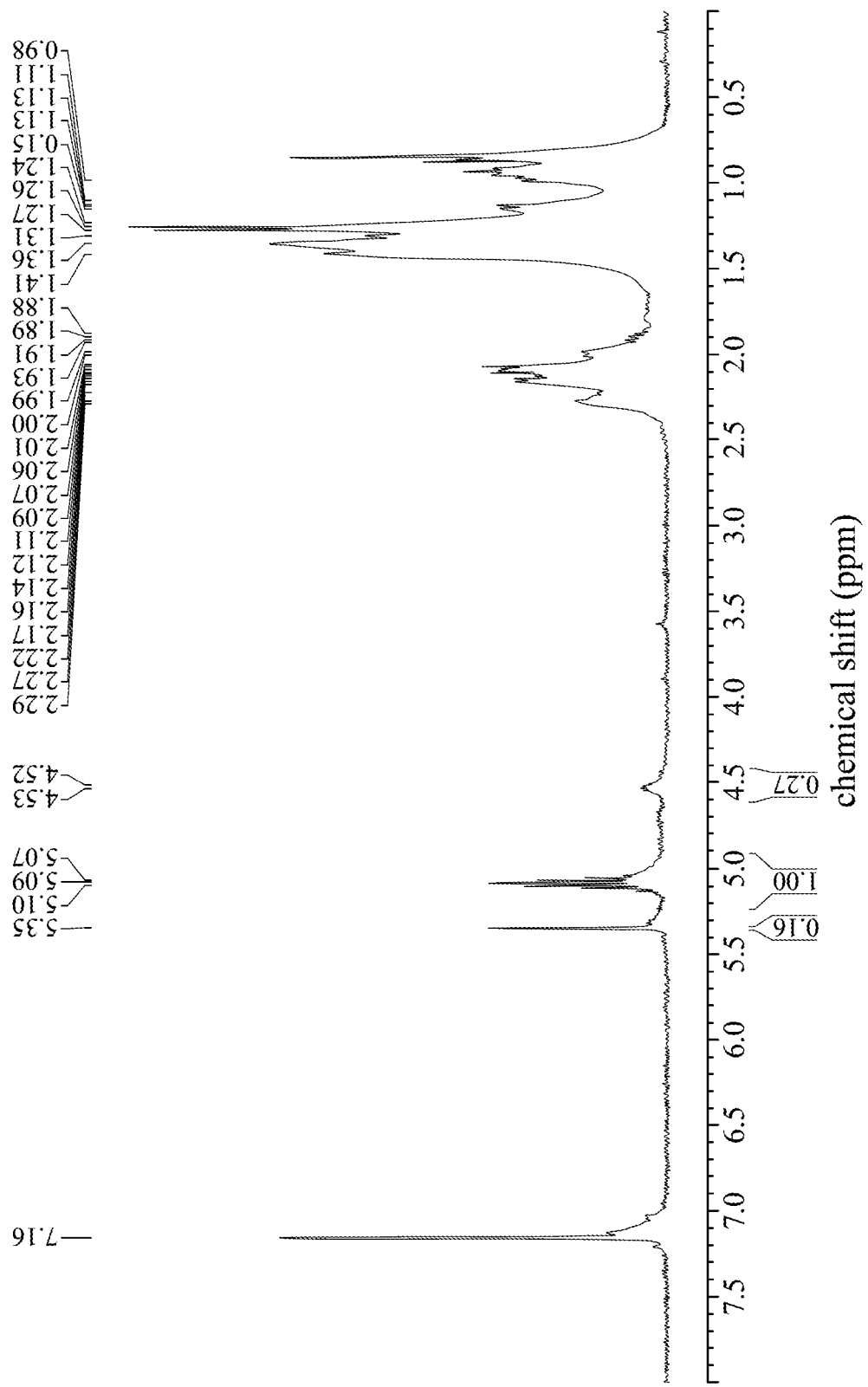
Figure 3M:
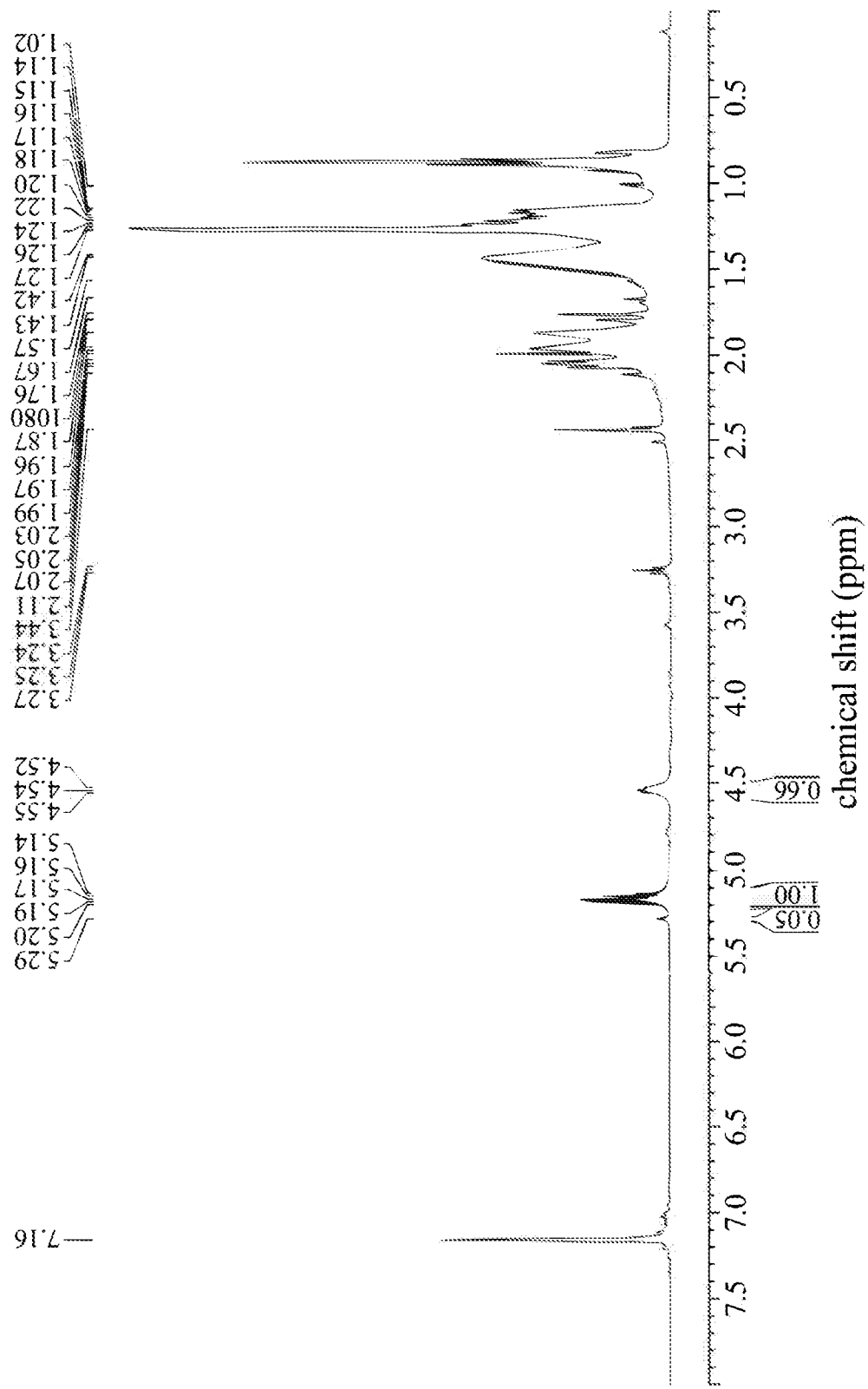

Please refer to FIG. 2. FIG. 2 is a simplified synthesizing equation of a titanium catalyst according to the present disclosure. In detail, the titanium catalyst of the present disclosure can be synthesized by chemical reaction between a precursor 210 and a precursor 220, that is, a product 230 and a product 240 can be the titanium catalyst of the present disclosure. More particular, the product 230 is also a reaction intermediate of the synthesizing process of the product 240.

Since the titanium catalysts having a similar chemical structure with product 240 have an extremely low solubility to solvent, it is hard to measure their by nuclear magnetic resonance spectroscopy (NMR). Therefore, the chemical structures of the titanium catalysts having a similar chemical structure with product 240 need to be identified by the NMR analysis results of their reaction intermediate, thereby confirming whether the ligands of the titanium catalysts are as expected or not.

Please refer to FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, and FIG. 3M. FIG. 3A to FIG. 3M are nuclear magnetic resonance spectroscopy diagrams of the reaction intermediate of example 1, the reaction intermediate of example 2, the reaction intermediate of example 3, the reaction intermediate of example 4, the reaction intermediate of example 5, the reaction intermediate of example 6, the reaction intermediate of example 7, the example 14, the reaction intermediate of example 9, the reaction intermediate of example 10, the reaction intermediate of example 11, the example 12 and the example 13, respectively. According to FIG. 3A to FIG. 3M, each titanium catalyst of examples of the present disclosure has expected ligand structure.

Test 2. Applying the Titanium Catalyst of the Present Disclosure in the Synthesizing Method of Polyester Resins Test 2-1-1. When the Diol Monomer are EG and CHDM, and the Dicarboxylic Acid Monomer is PTA In order to test the effects of accelerating the reaction speed of the polymerization reaction and reducing the yellowing phenomenon of the polyester resins of the titanium catalyst, the examples of the titanium catalyst of the present disclosure are applied into the synthesizing method of polyester resins of the present disclosure and further compared with the conventional catalysts.

In the test 2-1-1, EG and CHDM are applied as the diol monomer and PTA is applied as the dicarboxylic acid monomer in the synthesizing method of polyester resin so as to synthesize PECT. The test results of applying different catalysts are categorized as experimental examples and comparative examples. Subsequently, the viscosity (IV) of the experimental examples and the comparative examples are measured to determine whether the reactions of the experimental examples and the comparative examples are stopped or not. Further, the brightness (L*), color (b*) and yellow index (YI) of the experimental examples and the comparative examples are also measured. In detail, in the present disclosure, the viscosity measuring method is ASTM D4603, the color measuring method is ASTM D6290, and the yellow index measuring method is ASTM D6290, but the present disclosure is not limited thereto. The aforementioned measuring data are shown in Table 2 below.

TABLE 2

|  | Experimental example 1 | Experimental example 2 | Comparative example 1 | Comparative example 2 | Comparative example 3 |
|---|---|---|---|---|---|
| catalyst | Example 10 | Example 14 | Formula (A) | TBT | $Sb_2O_3$ |
| polymerization time (mins) | 152 | 170 | 228 | 199 | 136 |
| L* | 61.0 | 65.3 | 64.3 | 64.4 | 48.0 |
| b* | 10.0 | 10.9 | 13.7 | 13.9 | 4.0 |
| YI | 26 | 27 | 34 | 34 | 11.6 |
| IV | 0.65 | 0.60 | 0.58 | 0.64 | 0.64 |

Formula (A) shown in Table 2 is a conventional four-coordinate single-core titanium catalyst, and the structural formula thereof is shown below:

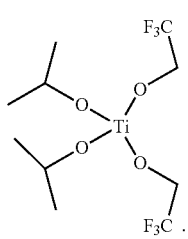

Formula (A)

Titanium (IV) butoxide (TBT) and $Sb_2O_3$ shown in Table 2 are the catalysts widely used for synthesizing process of polyester resins at present, wherein TBT easily loses its catalyzing function when exposed to water, while $Sb_2O_3$ is toxic to human body.

Please refer to Table 2. In terms of the polymerization time of PECT, the polymerization reaction using the titanium catalyst of example 10 has the shortest polymerization time. Further, the polymerization time of the polymerization reaction using the titanium catalyst of example 10 and the polymerization time of the polymerization reaction using the titanium catalyst of example 14 are both shorter than the polymerization time using other comparative examples except for using $Sb_2O_3$ as the catalyst. The result indicates that the titanium catalyst of the present disclosure has an effect of effectively shortening the polymerization time of the polymerization reaction, and the aforementioned effect is better than most of the conventional catalysts.

Please refer to Table 2 again. In terms of the brightness of PECT, the brightness of PECT synthesized by the titanium catalyst of example 10, the brightness of PECT synthesized by the titanium catalyst of example 14, the brightness of PECT synthesized by the titanium catalyst of the Formula (A) and the brightness of PECT synthesized by TBT are not only similar to each other but also higher than the brightness of PECT synthesized by $Sb_2O_3$. The result indicates that the titanium catalyst of the present disclosure has an effect of brightening the polyester resins, and the aforementioned effect is better than or equivalent to the conventional catalysts.

Please refer to Table 2 again. In terms of the color and the yellow index of PECT, wherein when the value of b* is positive, the larger b* value means the color of the PECT is darker and yellower. Therefore, the smaller positive value of b* is preferred. On the other hand, when the value of YI is larger means the color of the PECT is yellower. Therefore, the smaller positive value of YI is preferred.

In detail, although the color and the yellow index of PECT synthesized by the titanium catalyst of example 10 and PECT synthesized by the titanium catalyst of example 14 are not as light as PECT synthesized by $Sb_2O_3$, the color and the yellow index of PECT synthesized by the titanium catalyst of example 10 and PECT synthesized by the titanium catalyst of example 14 are both lighter than the color and the yellow index of PECT synthesized by the titanium catalyst of the Formula (A) and PECT synthesized by TBT. The result indicates that the titanium catalyst of the present disclosure has an effect of reducing the color and the yellow index of the polyester resins, and the aforementioned effect is better than most of the conventional catalysts.

In particular, in comparison with $Sb_2O_3$, the titanium catalyst of the present disclosure is harmless to human body. Further, the polyester resins synthesized by the titanium catalyst of the present disclosure has a higher brightness value, therefore the titanium catalyst of the present disclosure is able to replace $Sb_2O_3$ to applied in the use of synthesizing polyester resins.

Test 2-1-2. Applying the Titanium Catalyst of the Present Disclosure in Synthesizing Other Polyester Resins In the test 2-1-2, the titanium catalyst of the present disclosure (example 8) and the synthesizing method of polyester resins are applied in synthesizing other polyester resins. The parameters and experimental data such as the synthesized polyester resins, the added amount of the titanium catalyst, the catalyst reactivity, the applied dicarboxylic acid monomer, the applied diol monomer and the viscosities of the polyester resins are recorded, wherein the viscosity measuring method in test 2-1-2 is as same as the viscosity measuring method in test 2-1-1 and will not be described herein. The aforementioned parameters and experimental data are shown in Table 3 below.

TABLE 3

| Synthesized polyester resin | PET | PBT | PETM | PETT | PBS | PBAT |
|---|---|---|---|---|---|---|
| Added amount of example 8 (ppm) | 10 | 60 | 100 | 20 | 100 | 100 |

TABLE 3-continued

| Synthesized polyester resin | PET | PBT | PETM | PETT | PBS | PBAT |
|---|---|---|---|---|---|---|
| Catalyst reactivity | Yes | Yes | Yes | Yes | Yes | Yes |
| PTA | 100 | 100 | 100 | 100 | 0 | 45 |
| Succinic acid | 0 | 0 | 0 | 0 | 100 | 0 |
| Adipic acid | 0 | 0 | 0 | 0 | 0 | 55 |
| EG | 100 | 0 | 90 | 75 | 0 | 0 |
| BDO | 0 | 100 | 0 | 0 | 100 | 100 |
| CBDO | 0 | 0 | 10 | 0 | 0 | 0 |
| TCDDM | 0 | 0 | 0 | 25 | 0 | 0 |
| IV | 0.76 | 0.80 | 0.82 | 0.74 | 1.25 | 1.21 |

Please refer to Table 3. According to the results shown in Table 3, the titanium catalyst and the synthesizing method of polyester resins of the present disclosure can be applied in synthesizing many different kinds of polyester resins with a great polymerization effect.

Test 2-2. Hydrolysis Reactions of the Titanium Catalysts

Although conventional catalysts such as TBT and titanium (IV) isopropoxide (TPT) are widely applied in synthesizing polyester resins, they become ineffective when they expose to water. Therefore, when water forms as a by-product during the esterification reaction of the polyester resins synthesizing process, the conventional catalysts easily lose their catalytic effects.

In order to test the catalytic performance of the titanium catalyst of the present disclosure in water-containing environment, the titanium catalyst of the present disclosure (example 8) is applied in the reaction of polyester resins synthesis and compared with conventional catalysts.

In the test 2-2, the catalyst is mixed with water in a weight ratio of 1:10 to form a mixture, and the titanium concentration of the mixture is 100 ppm. After stirring the mixture with a stirrer for 30 minutes, the mixture is mixed with BDO and dimethyl terephthalate (DMT), then slowly heated to 230° C. to perform the esterification reaction for 3 hours and the unnecessary methanol and water are simultaneously vaporized. Subsequently, the reaction system is slowly heated to 250° C. in 2 hours, and the reaction system is vacuumed till the pressure is in a rage of 0 torr to 3 torr so as to observe whether the monomers perform the polymerization reaction. Whether the polymerization reaction occurs or not can be confirmed by observing whether the stirring torque of the mixer increases or not. The viscosity measuring method in test 2-2 is as same as the viscosity measuring method in test 2-1-1 and will not be described herein. The experimental results are shown in Table 4 below.

TABLE 4

| | Experimental example A | Comparative example A | Comparative example B |
|---|---|---|---|
| Catalyst | Example 8 | TBT | TPT |
| Catalyst reactivity of the polymerization reaction | Yes | No | No |
| IV | 0.81 | <0.3 | <0.3 |

Please refer to Table 4 above. According to Table 4, the titanium catalyst of example 8 still has a catalyzing function to the polymerization reaction after being mixed with water. In contrast, the catalyzing effect of the conventional catalysts TBT and TPT are lost or reduced since they carry out hydrolysis reactions when they expose to water, respectively. The aforementioned experimental results indicate that the titanium catalyst of the present disclosure will not easily lose their catalyzing effect of polymerization reactions and is better than conventional catalysts.

In summary, the titanium catalyst and the synthesizing method of polyester resins of the present disclosure have an excellent polymerization performance, and can be used to synthesize many different kinds of polyester resins. Further, the titanium catalyst of the present disclosure is not easy to lose its catalyzing effect due to hydrolysis reaction. Moreover, the titanium catalyst of the present disclosure is harmless to human body. Therefore, the titanium catalyst and the synthesizing method of polyester resins of the present disclosure can achieve the goals of shortening the reaction time of polymerization reactions and reducing the color of polyester resins.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A titanium catalyst, having a chemical structure shown as Formula (I) or Formula (II):

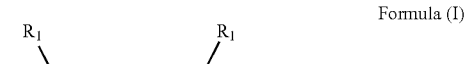

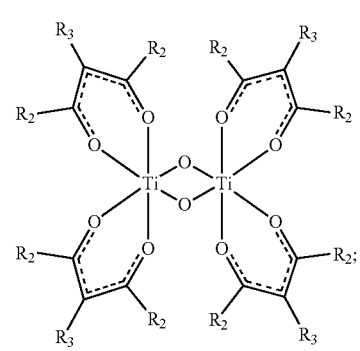

wherein each of the $R_1$ in the Formula (I) is independently an n-propyl group, an isopropyl group, a phenyl group, a 3,5-xylyl group, a group shown as Formula (MAI), a group shown as Formula (MAII) or a group shown as Formula (MAIII):

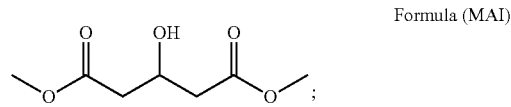

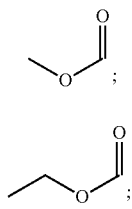
Formula (MAII)

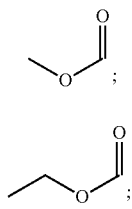
Formula (MAIII)

each of the $R_2$ in the Formula (II) is independently a methyl group, a phenyl group, a trifluoromethyl group or an ethyl group, each of the $R_3$ in the Formula (II) is independently a hydrogen or an n-propyl group, and the $R_2$ and the $R_3$ are not simultaneously the methyl group and the hydrogen, respectively.

2. The titanium catalyst of claim 1, wherein the titanium catalyst has a chemical structure shown as Formula (IA), Formula (IB), Formula (IC), Formula (ID), Formula (IE), Formula (IF), Formula (IG), Formula (IIA-H), Formula (IIB-H), Formula (IIC-H) or Formula (IID-Pr):

Formula (IA)
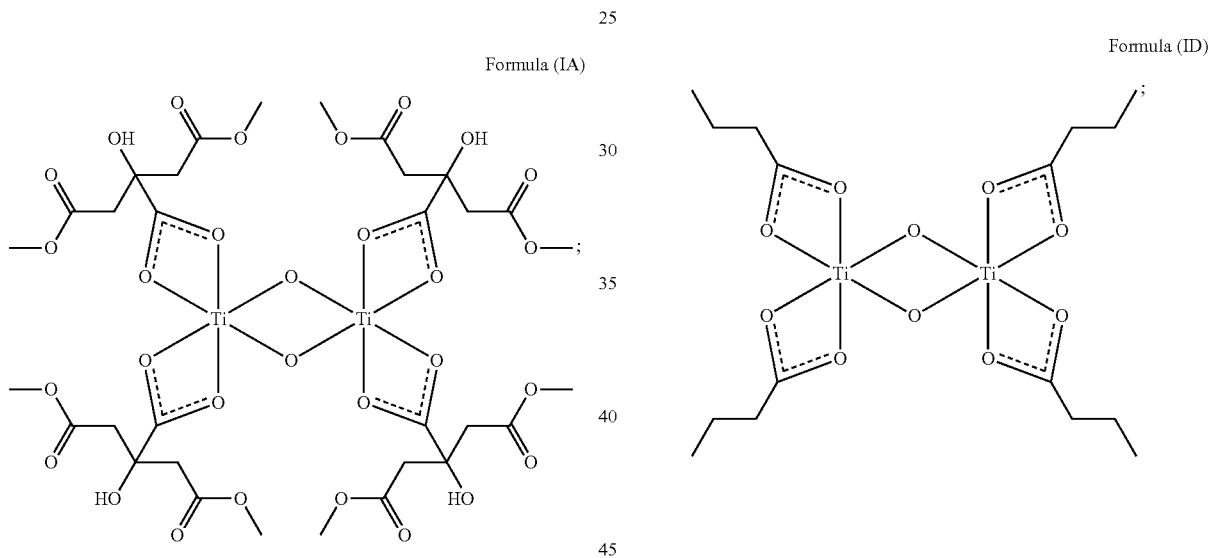

Formula (IB)
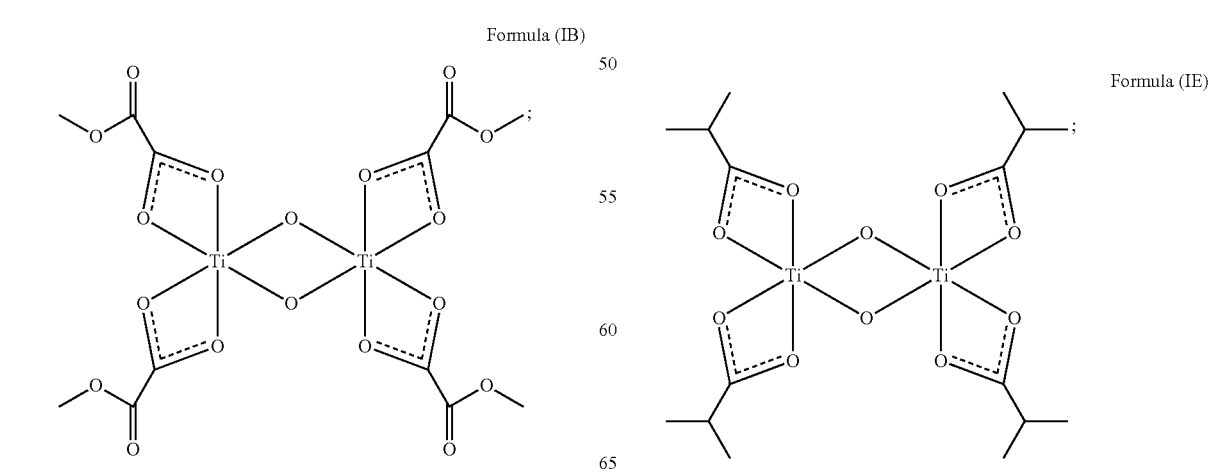

Formula (IC)
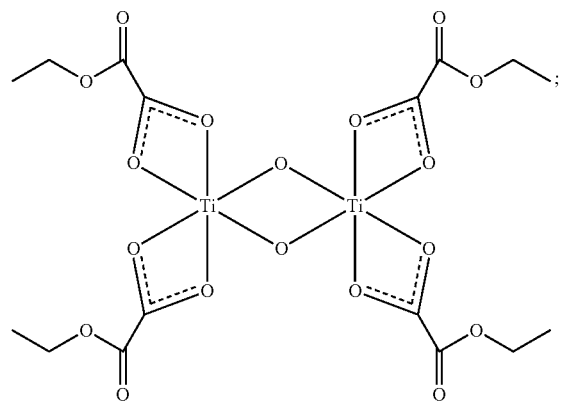

Formula (ID)
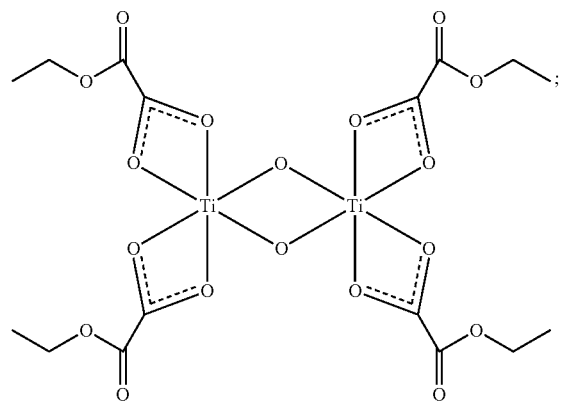

Formula (IE)
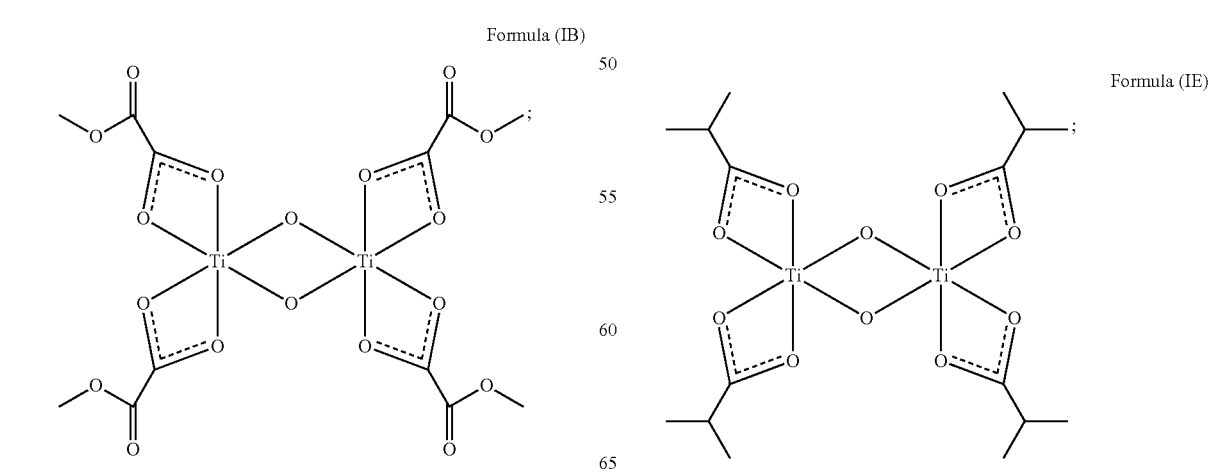

Formula (IF)

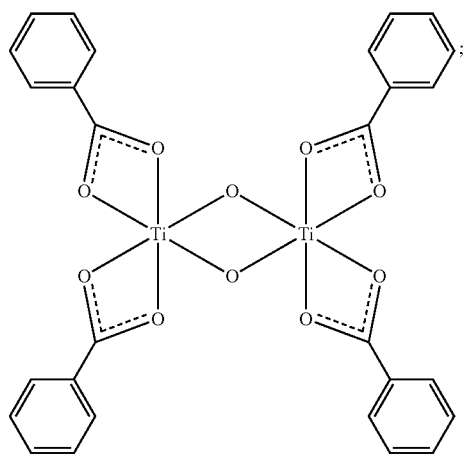

Formula (IG)

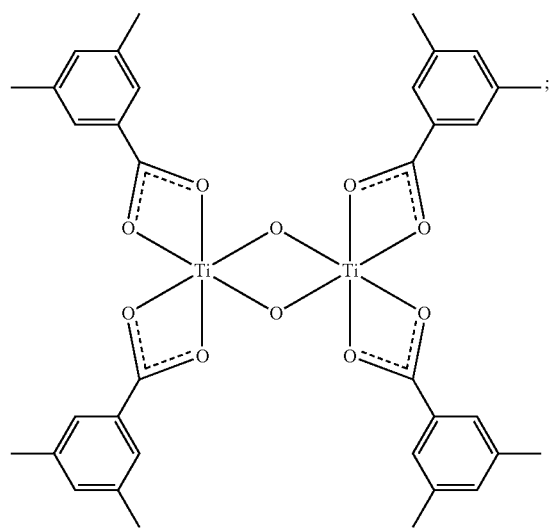

Formula (IIA-H)

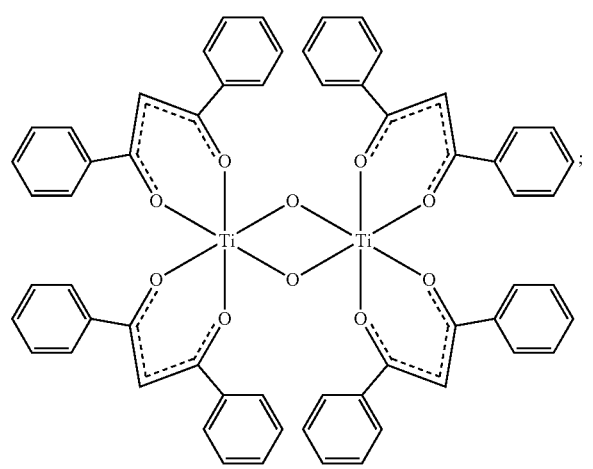

Formula (IIB-H)

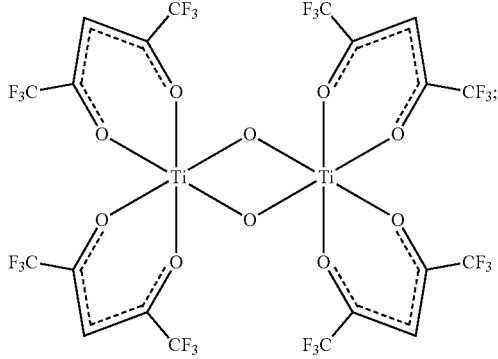

Formula (IIC-H)

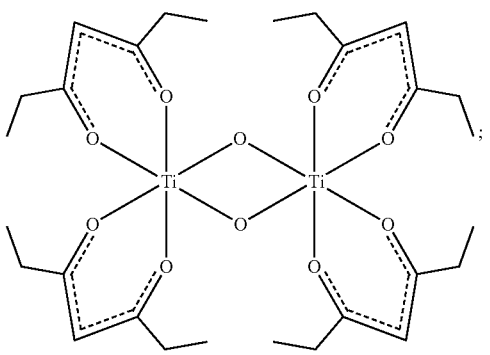

Formula (IIB-H)

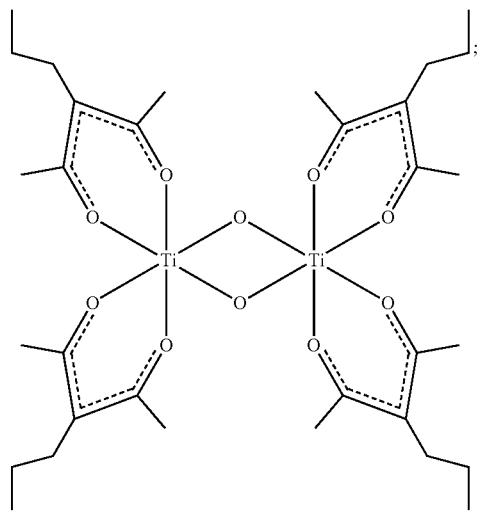

3. A synthesizing method of polyester resins, comprising:
providing the titanium catalyst of claim 1;
performing a feeding step, wherein a reaction monomer is added into an autoclave, the reaction monomer comprises a dicarboxylic acid monomer and a diol monomer, a number of carbon atoms of the dicarboxylic acid monomer is less than 20, and a number of carbon atoms of the diol monomer is less than 20;
performing a heating and pressurizing step, wherein the autoclave is set in a first heating state and a pressurizing state so as to carry out an esterification reaction; and
performing a heating and vacuuming step, wherein the autoclave is set in a second heating state and is vacuumed to a vacuum state so as to carry out a polymerization reaction;

wherein the titanium catalyst and a heat stabilizer are added into the autoclave before the feeding step or before the heating and vacuuming step.

4. The synthesizing method of polyester resins of claim 3, further comprising:
providing a promoter, wherein the promoter is added into the autoclave before the feeding step or before the heating and vacuuming step.

5. The synthesizing method of polyester resins of claim 3, wherein the dicarboxylic acid monomer is terephthalic acid, isophthalic acid, 2,6-naphthalenedicarboxylic acid, adipic acid, succinic acid or a mixture thereof.

6. The synthesizing method of polyester resins of claim 3, wherein the diol monomer is ethylene glycol, 1,4-butanediol, 1,3-propanediol, 1,4-cyclohexanedimethanol, 2-methyl-1,3-propanediol, neopentyl glycol, 2,2,4,4-tetramethyl-1,3-cyclobutanediol, bis(hydroxymethyl)tricyclodecane, isosorbide or a mixture thereof.

7. The synthesizing method of polyester resins of claim 3, wherein a temperature range of the first heating state is room temperature to 270° C., and a pressure range of the pressurizing state is 0 atm to 6 atm.

8. The synthesizing method of polyester resins of claim 3, wherein a temperature range of the second heating state is 250° C. to 300° C., and a pressure range of the vacuum state is less than 3 torr.

* * * * *